(12) United States Patent
Hirasawa

(10) Patent No.: US 10,313,542 B2
(45) Date of Patent: Jun. 4, 2019

(54) FUNCTION EXECUTION APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventor: Yoshi Hirasawa, Anjo (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/881,900

(22) Filed: Jan. 29, 2018

(65) Prior Publication Data

US 2018/0234564 A1 Aug. 16, 2018

(30) Foreign Application Priority Data

Feb. 10, 2017 (JP) ................................. 2017-023303

(51) Int. Cl.
*G06F 15/00* (2006.01)
*H04N 1/00* (2006.01)
*H04N 1/44* (2006.01)

(52) U.S. Cl.
CPC ..... *H04N 1/00506* (2013.01); *H04N 1/00411* (2013.01); *H04N 1/00424* (2013.01); *H04N 1/00432* (2013.01); *H04N 1/00474* (2013.01); *H04N 1/00514* (2013.01); *H04N 1/4433* (2013.01); *H04N 2201/0094* (2013.01)

(58) Field of Classification Search
CPC ........... H04N 1/00506; H04N 1/00411; H04N 2201/0094; H04N 1/4433; H04N 1/00514; H04N 1/00424
USPC .......................................................... 358/1.14
See application file for complete search history.

(56) References Cited

U.S. PATENT DOCUMENTS

2010/0287490 A1    11/2010  Ichimi
2017/0160902 A1*    6/2017  Shimizu .............. G06F 3/04817

FOREIGN PATENT DOCUMENTS

JP          2010-262501 A    11/2010

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A function execution apparatus includes a display, a touch panel, and a controller configured to control the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively, each of the tab screens including a plurality of icons associated with a corresponding tab, at least one of the tab screens including a particular specified function icon and at least one of a shortcut-registrable icon and a shortcut icon.

22 Claims, 10 Drawing Sheets

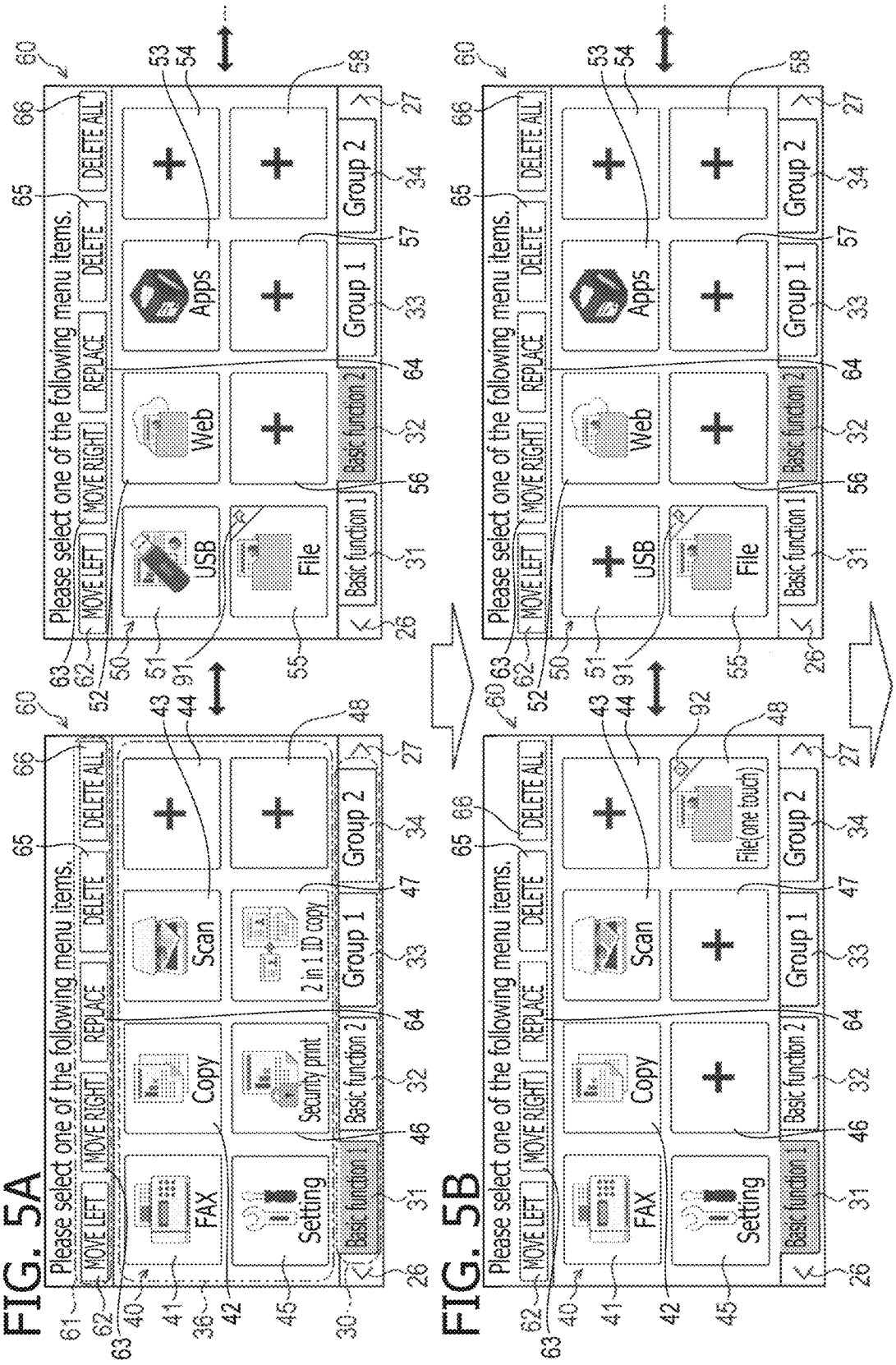

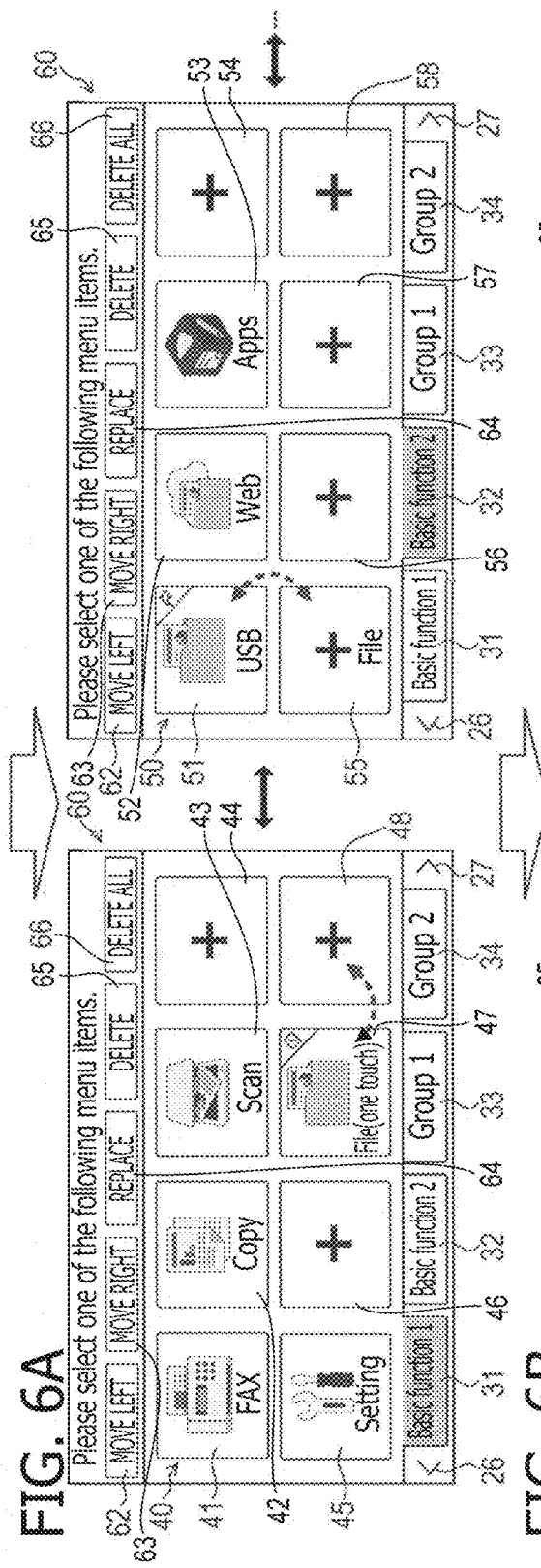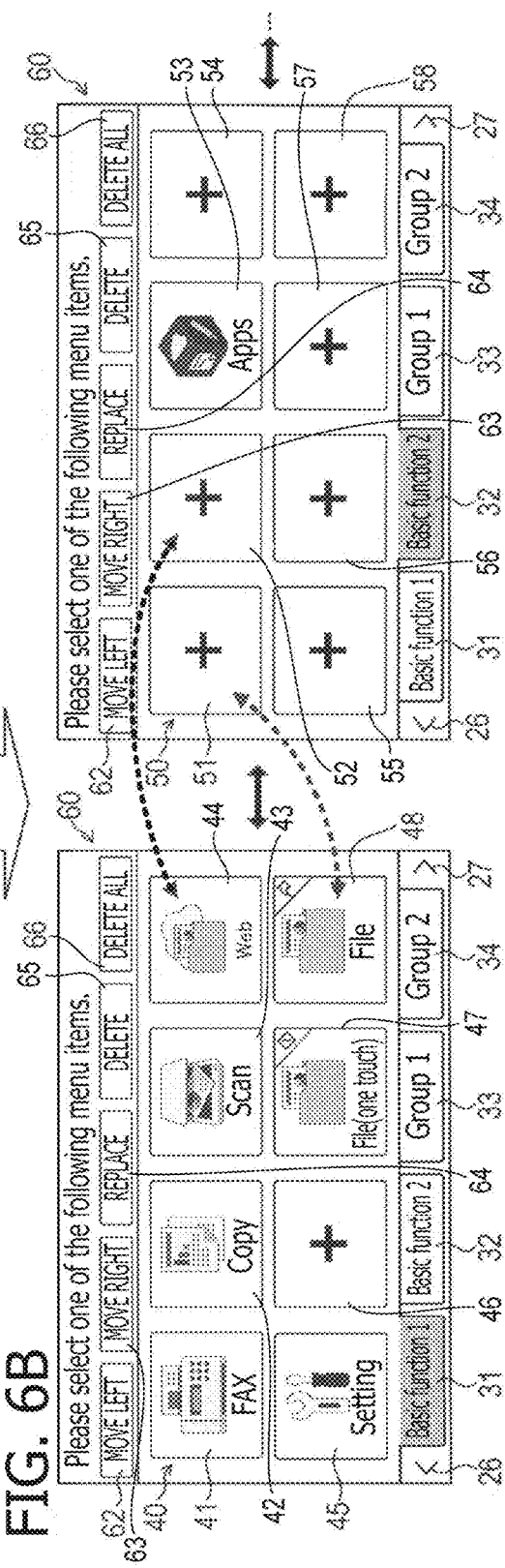

FUNCTION EXECUTION APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-023303 filed on Feb. 10, 2017. The entire subject matter of the application is incorporated herein by reference.

BACKGROUND

Technical Field

Aspects of the present disclosure are related to techniques to cause a function execution apparatus to execute a function selected via a standby screen displayed on a display of the apparatus.

Related Art

As an apparatus configured to execute a plurality of functions, an information processing apparatus has been known that is configured to display an operation screen in a tabbed form on a touch panel and change contents displayed on the operation screen by switching tabs.

In the known information processing apparatus, each of specified functions (e.g., a copy function and a facsimile function) is associated with a corresponding one of user-selectable tabs on the operation screen. Further, a tab for extension is provided on the operation screen. The tab for extension is associated with a specific tab screen on which a plurality of keys are arranged. A user may arbitrarily register, with each of the keys, a specific function to be executed in accordance with user-specific frequently-used settings or processing.

SUMMARY

In the known information processing apparatus, the tab for extension (i.e., the tab for the registered functions) is provided separately from the tabs for the specified functions. Therefore, for instance, when the user wishes to use one of the registered functions after using one of the specified functions, or the user wishes to use one of the specified functions after using one of the registered functions, the user needs to switch tabs. Thus, the known information processing apparatus is not user-friendly.

Aspects of the present disclosure are advantageous to provide one or more techniques to improve user-friendliness in selecting an intended function via a standby screen displayed in a tabbed form.

According to aspects of the present disclosure, a function execution apparatus is provided, which includes a display, a touch panel configured to detect an indicating operation to indicate a position on the display, and a controller configured to execute a plurality of functions and perform a particular control process. The particular control process includes a standby screen displaying process including controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively. Each of the tab screens includes a plurality of icons associated with a corresponding tab. At least one of the tab screens includes a particular specified function icon and at least one of a shortcut-registrable icon and a shortcut icon.

The particular specified function icon is previously registered as an icon for causing the controller to execute a particular function of the plurality of functions, each function being registered with a corresponding one of specified function icons. The shortcut-registrable icon is an icon with which a shortcut function is registrable, the shortcut function enabling the controller to execute a specific function of the plurality of functions under a specific execution condition. The shortcut icon is generated to replace the shortcut-registrable icon therewith in response to the shortcut function being registered with the shortcut-registrable icon. The shortcut icon is configured to, when operated, cause the controller to execute the shortcut function. The particular control process further includes a tab screen switching process including, when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area. The particular control process further includes an icon operation responding process including, when the particular specified function icon is displayed on the standby screen, in response to detecting, via the touch panel, an indicating operation to indicate the particular specified function icon, starting a process to execute the particular function registered with the specified function icon, when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon, and when the shortcut icon is displayed on the standby screen, in response to detecting, via the touch panel, an indicating operation to indicate the shortcut icon, starting a process to execute the shortcut function registered with the shortcut icon.

According to aspects of the present disclosure, further provided is a method implementable on a processor connected with a display and a touch panel configured to detect an indicating operation to indicate a position on the display, the method including controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively. Each of the tab screens includes a plurality of icons associated with a corresponding tab. At least one of the tab screens includes a particular specified function icon and at least one of a shortcut-registrable icon and a shortcut icon. The particular specified function icon is previously registered as an icon for causing the processor to execute a particular function of a plurality of functions executable by the processor, each function being registered with a corresponding one of specified function icons. The shortcut-registrable icon is an icon with which a shortcut function is registrable, the shortcut function enabling the processor to execute a specific function of the plurality of functions under a specific execution condition. The shortcut icon is generated to replace the shortcut-registrable icon therewith in response to the shortcut function being registered with the shortcut-registrable icon. The shortcut icon is configured to, when operated, cause the processor to execute the shortcut function. The method further includes, when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area, when the particular specified function icon is displayed on the standby screen, in response to detecting, via the touch panel, an indicating operation to indicate the particular specified function icon, starting a process to execute the particular function registered with the specified function icon, when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon, and when the shortcut icon is displayed on the standby screen, in response to detecting, via the touch panel, an indicating operation to indicate the shortcut icon, starting a process to execute the shortcut function registered with the shortcut icon.

According to aspects of the present disclosure, further provided is a non-transitory computer-readable medium storing computer-readable instructions that are executable by a processor connected with a display and a touch panel configured to detect an indicating operation to indicate a position on the display. The instructions are configured to, when executed by the processor, cause the processor to execute a plurality of functions and perform a particular control process. The particular control process includes a standby screen displaying process including controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively. Each of the tab screens includes a plurality of icons associated with a corresponding tab. At least one of the tab screens includes a particular specified function icon and at least one of a shortcut-registrable icon and a shortcut icon. The particular specified function icon is previously registered as an icon for causing the processor to execute a particular function of the plurality of functions, each function being registered with a corresponding one of specified function icons. The shortcut-registrable icon is an icon with which a shortcut function is registrable, the shortcut function enabling the processor to execute a specific function of the plurality of functions under a specific execution condition. The shortcut icon is generated to replace the shortcut-registrable icon therewith in response to the shortcut function being registered with the shortcut-registrable icon. The shortcut icon is configured to, when operated, cause the processor to execute the shortcut function. The particular control process further includes a tab screen switching process including, when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area. The particular control process further includes an icon operation responding process including, when the particular specified function icon is displayed on the standby screen, in response to detecting, via the touch panel, an indicating operation to indicate the particular specified function icon, starting a process to execute the particular function registered with the specified function icon, when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon, and when the shortcut icon is displayed on the standby screen, in response to detecting, via the touch panel, an indicating operation to indicate the shortcut icon, starting a process to execute the shortcut function registered with the shortcut icon.

BRIEF DESCRIPTION OF THE ACCOMPANYING DRAWINGS

Figure 3:
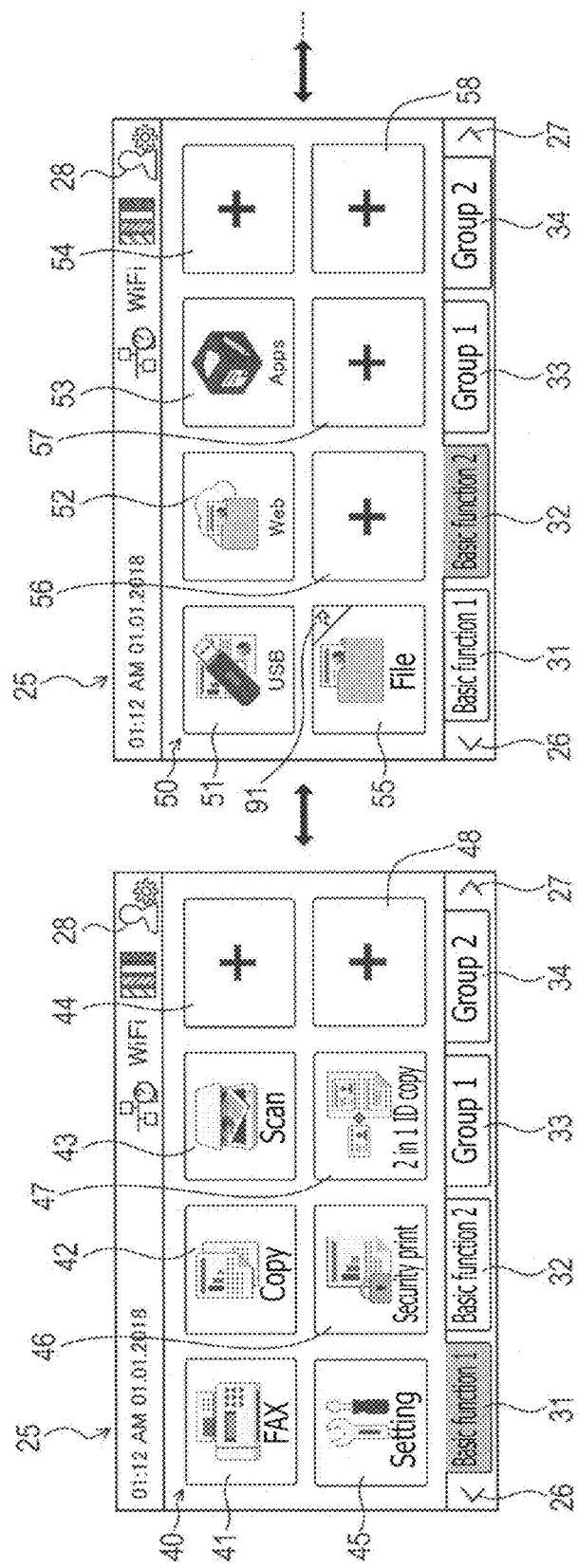

FIG. 3 exemplifies a standby screen displayed on a display of the function execution apparatus in the illustrative embodiment according to one or more aspects of the present disclosure.

Figure 4:
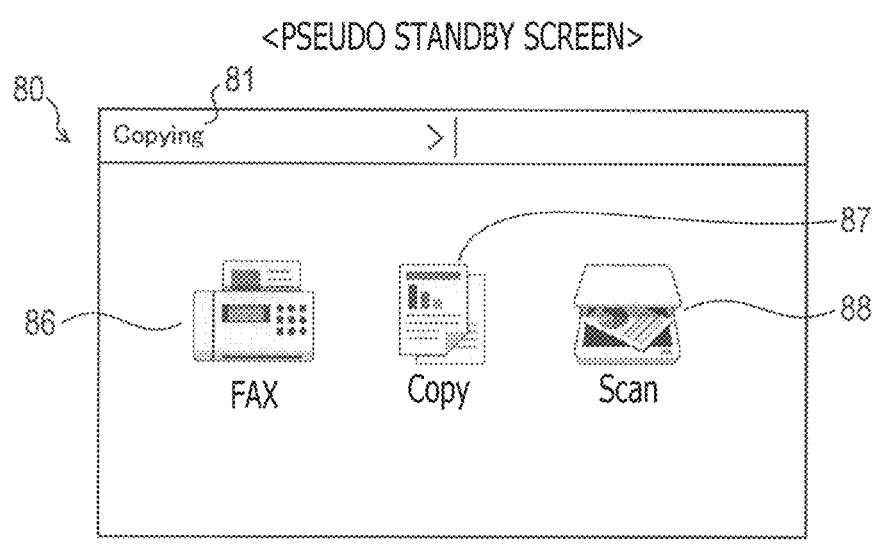

FIG. 4 exemplifies a pseudo standby screen displayed on the display of the function execution apparatus in the illustrative embodiment according to one or more aspects of the present disclosure.

FIGS. 5A, 5B, 6A, and 6B exemplify a sequence of edit operations to edit icons that are performed on a standby screen setting screen, in the illustrative embodiment according to one or more aspects of the present disclosure.

Figure 7:
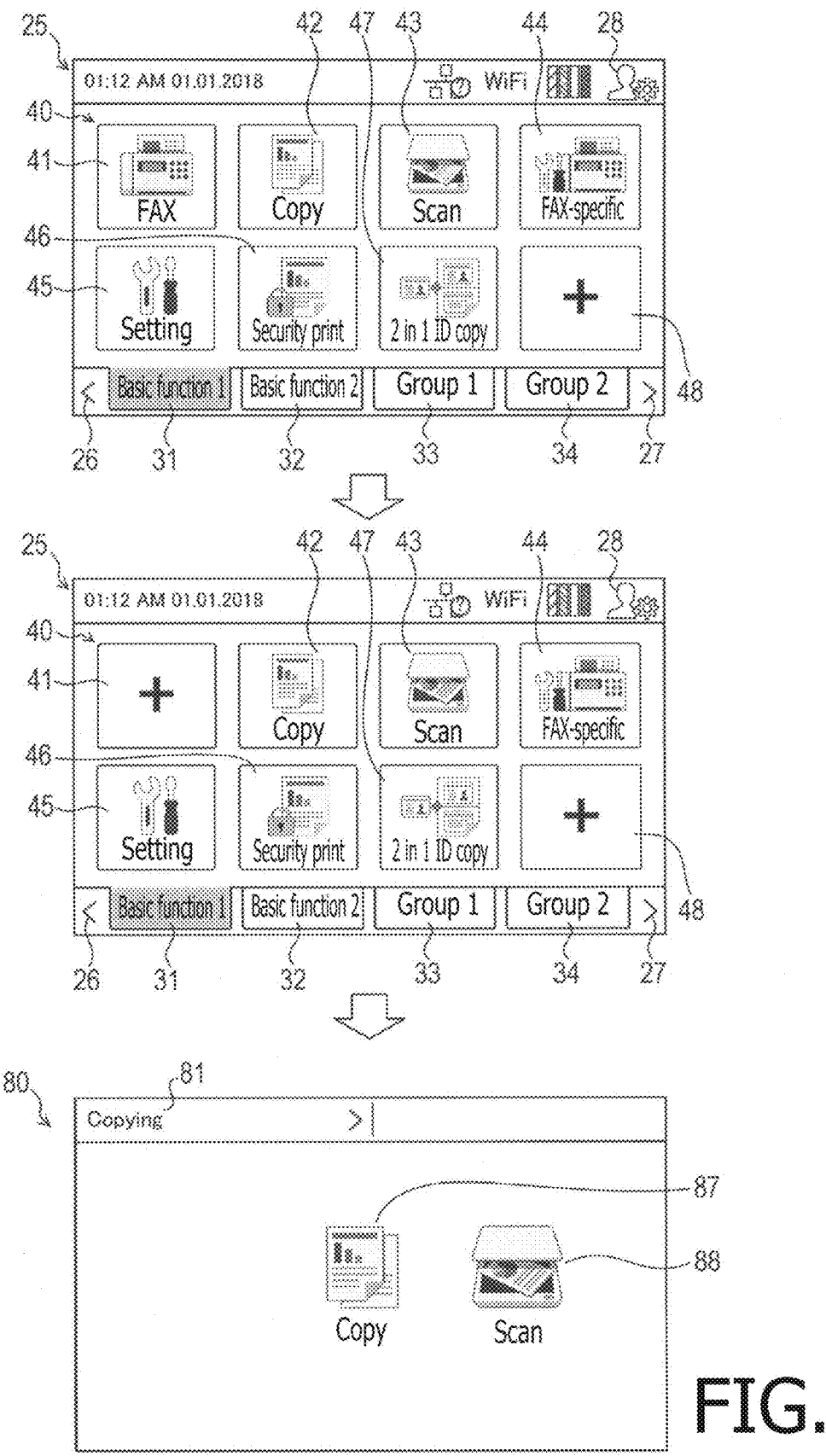

FIG. 7 exemplifies a transition of screens displayed on the display in a case where, after a facsimile icon is deleted from the standby screen, when a facsimile-specific mode is set as a reception mode of a facsimile function, the pseudo standby screen without the facsimile icon is displayed, in the illustrative embodiment according to one or more aspects of the present disclosure.

Figure 8:
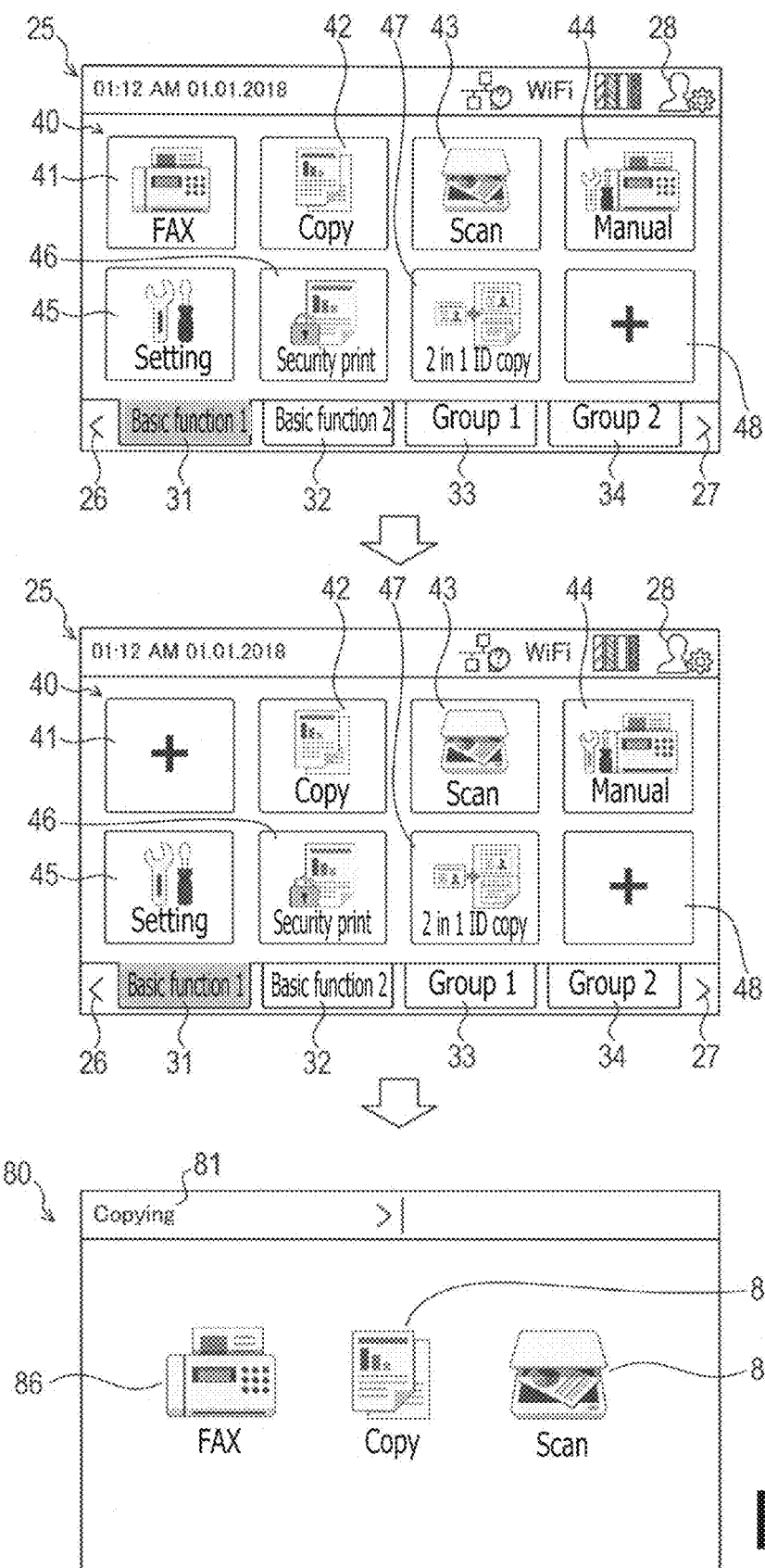

FIG. 8 exemplifies a transition of screens displayed on the display in a case where, after the facsimile icon is deleted from the standby screen, when a manual mode is set as the reception mode of the facsimile function, the pseudo standby screen with the facsimile icon is displayed, in the illustrative embodiment according to one or more aspects of the present disclosure.

Figure 9A:
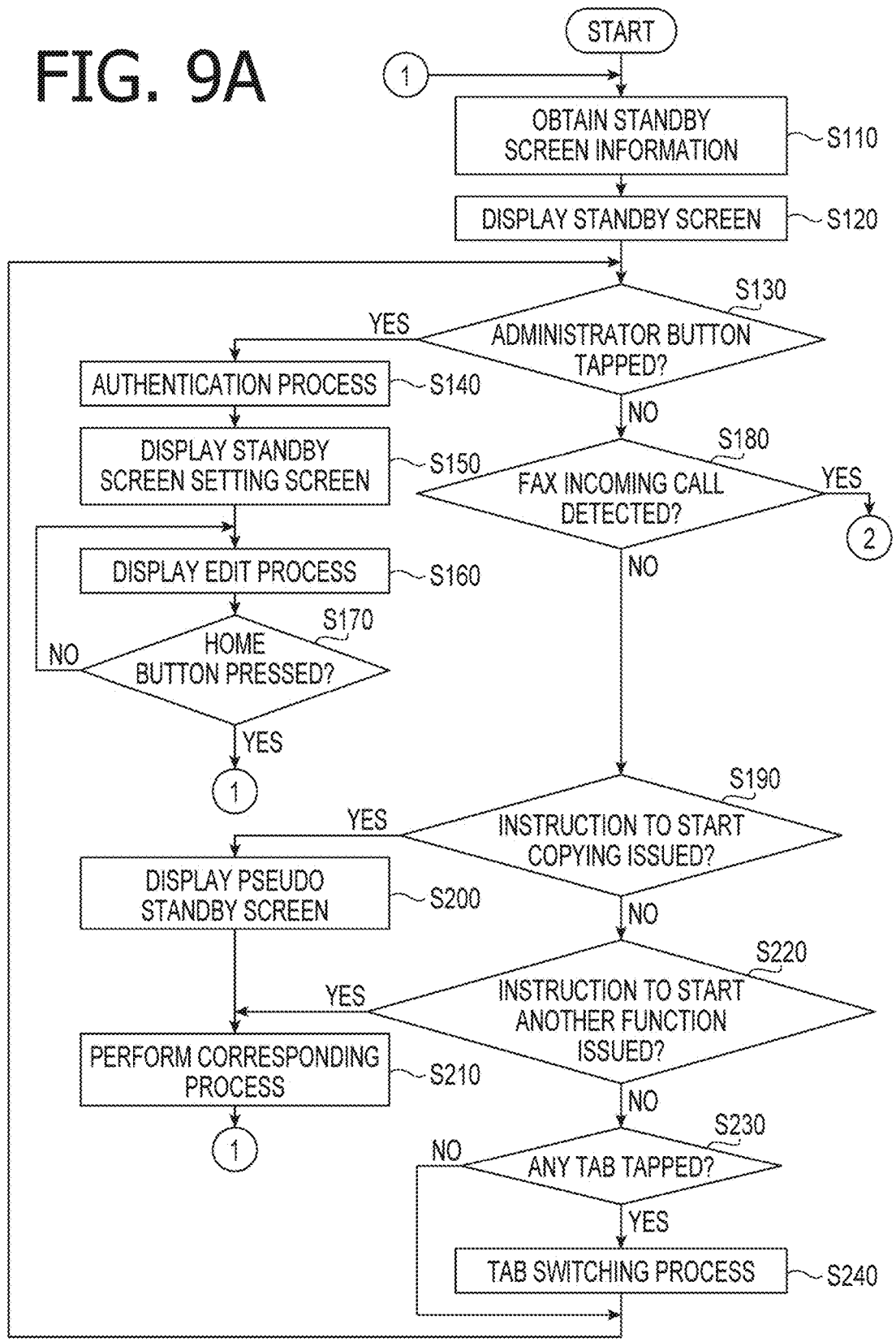
Figure 9B:
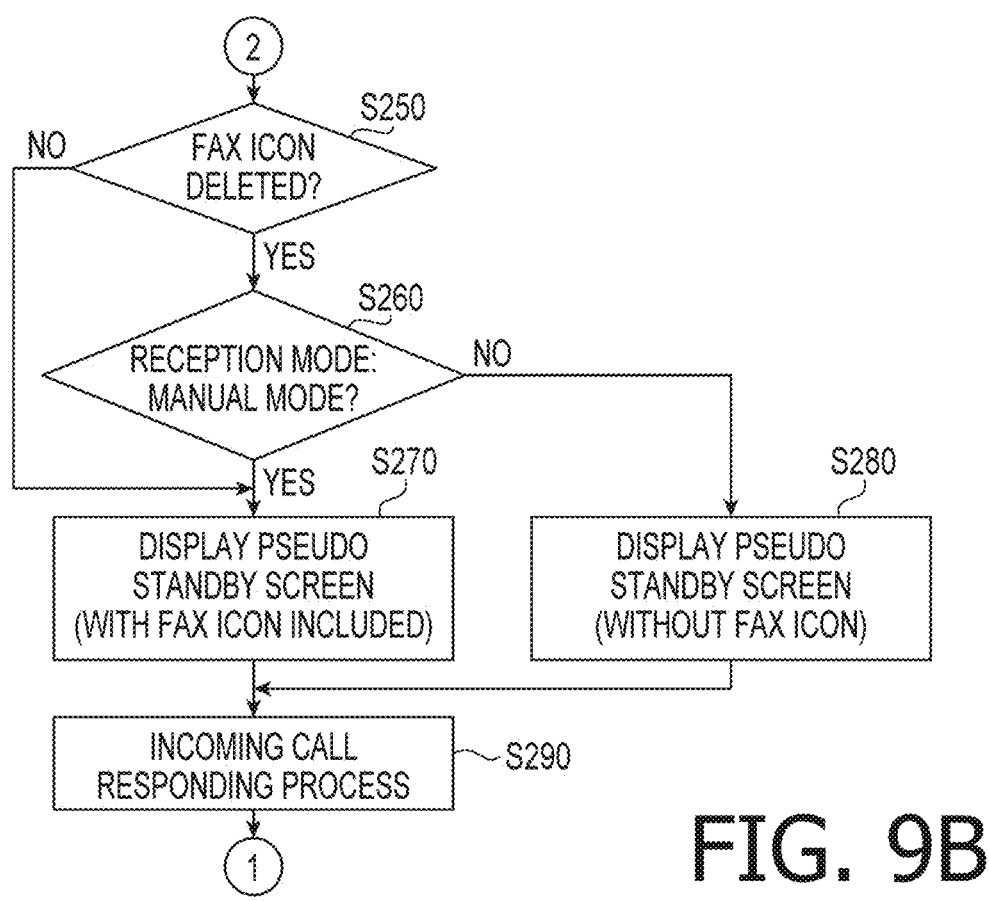

FIGS. 9A and 9B are flowcharts showing a procedure of a main control process to be executed by a controller of the function execution apparatus, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

[1. Illustrative Embodiment]

Hereinafter, an illustrative embodiment according to aspects of the present disclosure will be described with reference to the accompanying drawings.

(1-1) Configuration of Function Execution Apparatus

Figure 1:
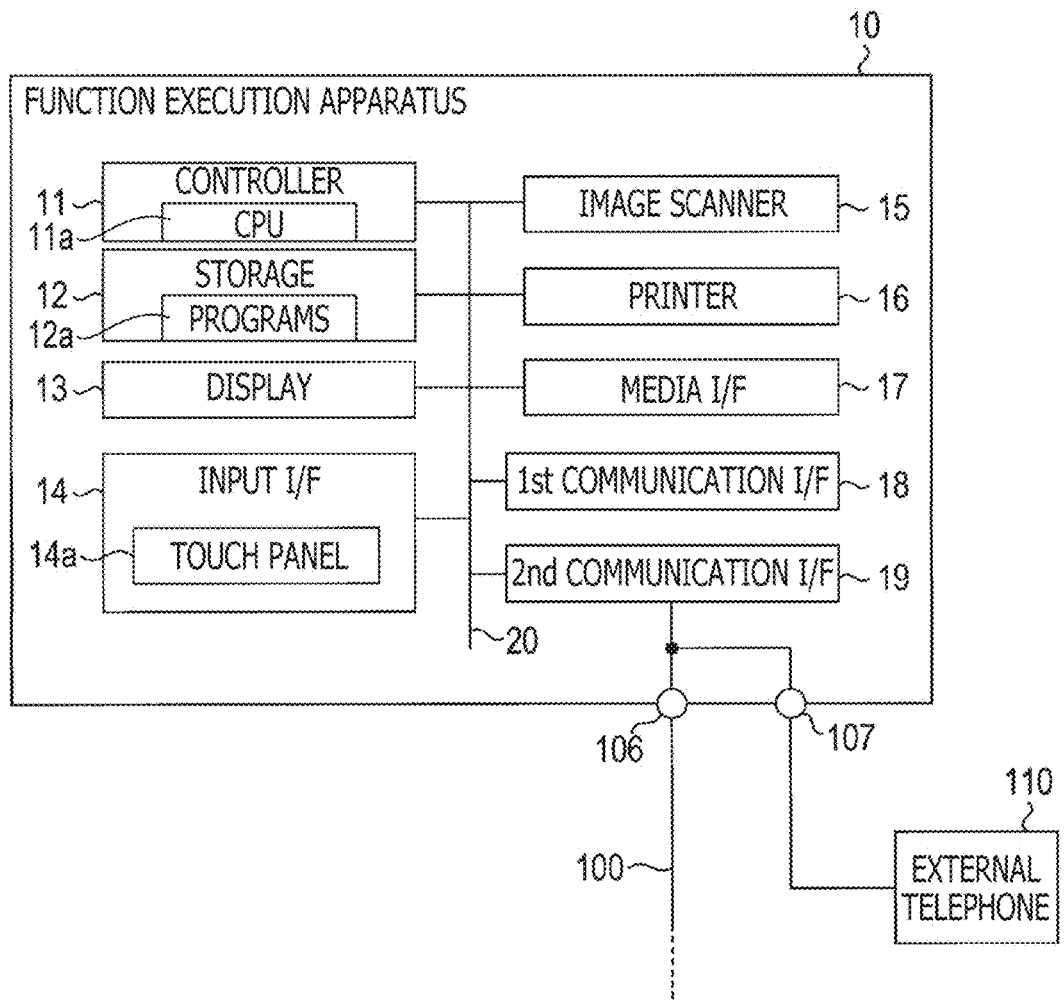
FIG. 1 is a block diagram schematically showing a configuration of a function execution apparatus in an illustrative embodiment according to one or more aspects of the present disclosure.

FIG. 1 is a block diagram showing an electrical configuration of a function execution apparatus 10 in the illustrative embodiment. The function execution apparatus 10 has a plurality of specified functions such as a scanning function, a printing function, a copy function, and a facsimile function. In the scanning function, the function execution apparatus 10 may scan an image of a document and generate image data of the scanned image. In the printing function, the function execution apparatus 10 may print an image on a recording sheet. In the copy function, the function execution apparatus 10 may print an image scanned by the scanning function, on a recording sheet by the printing function. In the facsimile function, the function execution apparatus 10 may send and receive facsimile data.

As shown in FIG. 1, the function execution apparatus 10 includes a controller 11, a storage 12, a display 13, an input interface (hereinafter referred to as an "input I/F") 14, an image scanner 15, a printer 16, a media interface (hereinafter referred to as a "media I/F") 17, a first communication interface (hereinafter referred to as a "first communication I/F") 18, and a second communication interface (hereinafter referred to as a "second communication I/F") 19. The above elements of the function execution apparatus 10 are interconnected via a bus 20.

The controller 11 includes a CPU 11a. For instance, the storage 12 includes semiconductor memories such as a ROM, a RAM, an NVRAM, and a flash memory. Namely, the function execution apparatus 10 includes a microcomputer including the CPU 11a and the semiconductor memories.

The controller 11 is configured to execute various functions by executing programs stored in a non-transitory computer-readable storage medium. In the illustrative embodiment, the storage 12 may be an example of the non-transitory computer-readable storage medium. Further, programs 12a stored in the storage 12 may include the programs for the controller 11 to execute the various functions. Nonetheless, a part or a whole of each function executable by the controller 11 may be achieved by one or more hardware elements, instead of executing the programs 12a.

The storage 12 stores data for causing the display 13 to display various screens including a below-mentioned standby screen 25 (see FIG. 2). In addition, the programs 12a stored in the storage 12 include one or more programs for a below-mentioned main control process (see FIGS. 9A and 9B). The programs for the controller 11 to execute the various functions may be included in or separate from the one or more programs for the main control process.

The display 13 includes a display device (e.g., a liquid crystal display device and an organic EL display device) configured to display an image thereon. The input I/F 14 includes input devices configured to accept various kinds of input operations. The input devices include a power button 5, a numeric keypad 6, a back button 7, a home button 8, a stop button 9, and a touch panel 14a (see FIG. 2). The touch panel 14a is disposed in an image display area of the display device of the display 13.

The touch panel 14a may detect an indicating operation of bringing an indicator in contact with or in proximity to the image display area of the display 13. Namely, when the indicating operation is performed to indicate, by the indicator, a specific position within the image display area of the display 13, the touch panel 14a may output positional information representing the specific position indicated by the indicator. Further, in the illustrative embodiment, the touch panel 14a may continuously or periodically output the positional information while the indicating operation is being performed. It is noted that the touch panel 14a may only detect a contact between the indicator and the image display area of the display 13, may only detect proximity therebetween, or may detect both the contact and proximity therebetween.

The controller 11 may receive the positional information output from the touch panel 14a. Based on the received positional information, the controller 11 may detect whether an indicating operation using the indicator is being performed. Further, when an indicating operation using the indicator is being performed, the controller 11 may detect where is a specific position indicated by the indicating operation, and may detect at least one kind of particular operation using the indicator as the indicating operation.

As particular operations detectable by the controller 11, at least a tapping operation is cited. The tapping operation is an operation of, after performing an indicating operation using the indicator, separating the indicator away from a specific position indicated by the indicating operation. Examples of the indicator for performing the indicating operation may include a finger and a particular indication device such as a stylus.

The image scanner 15 includes an image sensor. The image scanner 15 is configured to scan an image of a document and generate image data of the scanned image. The image scanner 15 may include an automatic document feeder (hereinafter referred to as an "ADF"). Further, the image scanner 15 may be configured to scan both sides of a document sheet set on a document table or the ADF.

The printer 16 includes a printing mechanism using an inkjet technology or an electrophotographic technology. The printer 16 is configured to print an image on a recording sheet. The printer 16 may be configured to perform duplex printing to print images on both sides of a recording sheet.

The media I/F 17 is an interface to which various types of storage media (e.g., a USB flash memory) are attached. The media I/F 17 is configured to control read/write operations of reading data out of or writing data into a storage medium attached to the media I/F 17.

The first communication I/F 18 is configured to connect the function execution apparatus 10 with a data communication network. For instance, the first communication I/F 18 may be connectable with at least one of various kinds of networks such as a wired LAN, a wireless LAN, and an Internet. The function execution apparatus 10 may be configured to perform data communication with various types of information processing devices (e.g., PCs, smartphones, and tablet terminals) via the first communication I/F 18 using a wired or wireless communication technology. Further, the function execution apparatus 10 may be configured to connect with an Internet via the first communication I/F 18 and perform data communication with various servers and various information processing apparatuses via the Internet.

The second communication I/F 19 is configured to communicate with external devices via a communication network 100. In the illustrative embodiment, the communication network 100 may be a public telephone network. In the illustrative embodiment, the function execution apparatus 10 performs data communication using the facsimile function, basically via the second communication I/F 19.

The function execution apparatus 10 includes a network-side jack 106 and a telephone-side jack 107. The network-side jack 106 is for connecting the function execution apparatus 10 with external devices via the communication network 100. The telephone-side jack 107 is for connecting the function execution apparatus 10 with an external telephone 110. The network-side jack 106 and the telephone-side jack 107 are configured as modular jacks having the same shape. The second communication I/F 19 is connected with each of the jacks 106 and 107.

The second communication I/F 19 is connected with the communication network 100 via the network-side jack 106. Further, when the telephone-side jack 107 is connected with the external telephone 110, the second communication I/F 19 is connected with the external telephone 110 via the telephone-side jack 107. In addition, the external telephone 110 is directly connected with the communication network 100 via the telephone-side jack 107 and the network-side jack 106.

(1-2) Configuration of Operation Panel

Figure 2:
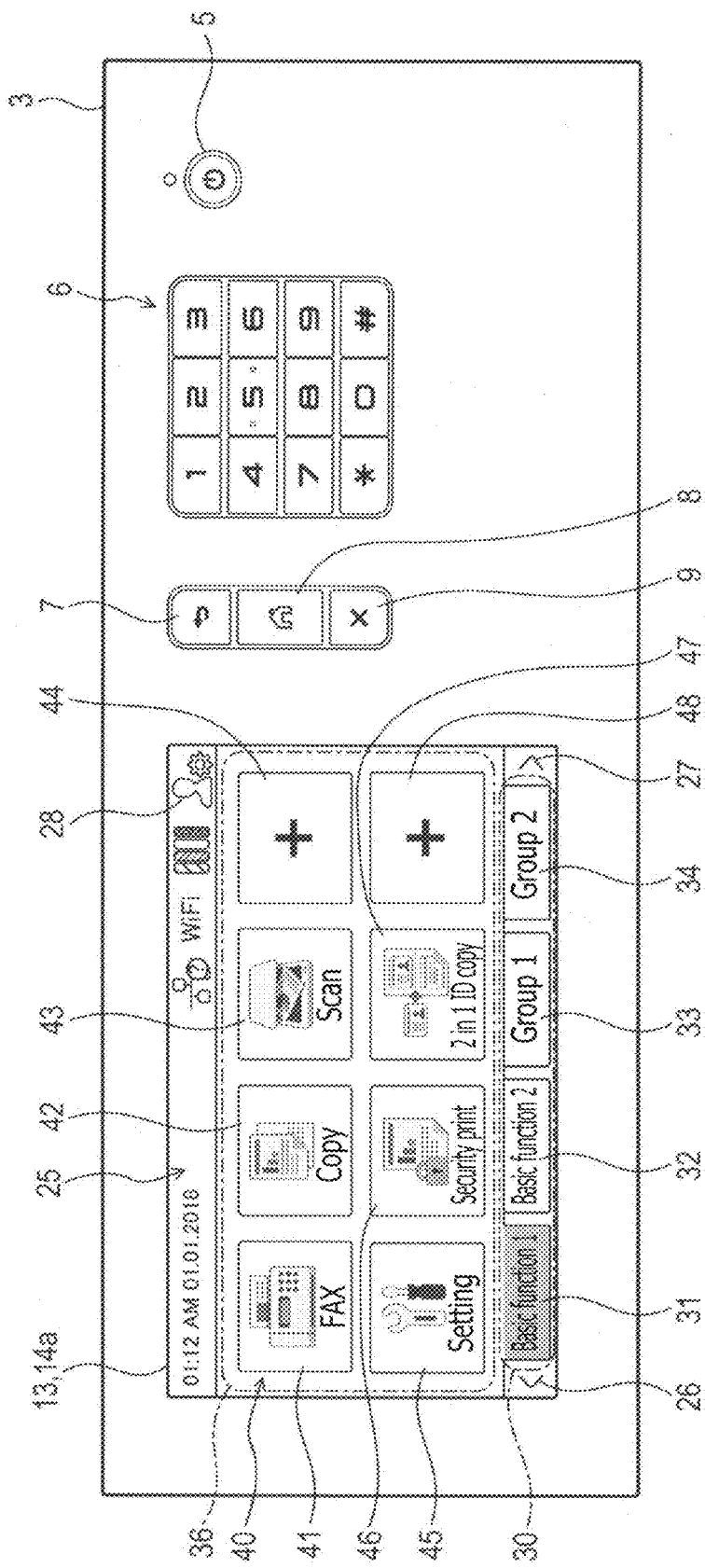
FIG. 2 shows an operation panel of the function execution apparatus in the illustrative embodiment according to one or more aspects of the present disclosure.

The function execution apparatus 10 includes an operation panel 3 shown in FIG. 2 that is disposed on a side face of a housing (not shown) of the apparatus 10. As shown in FIG. 2, on the operation panel 3, the power button 5, the numeric keypad 6, the back button 7, the home button 8, the stop button 9, the display 13, and the touch panel 14a are provided. It is noted that, specifically, the display 13 shown in FIG. 2 represents the image display area of the display device included in the display 13. The touch panel 14a is superimposed substantially over a whole range of the image display area.

The power button 5 is a hard key to be operated by the user to turn on and off the function execution apparatus 10. When the function execution apparatus 10 is powered on in response to the power button 5 being pressed, the controller 11 performs a particular initializing process, and thereafter controls the display 13 to display a standby screen 25. By performing various input operations via the standby screen 25 as a starting point, the user may switch a screen displayed on the display 13 to another screen, configure various settings, and cause the function execution apparatus 10 to execute various functions.

The numeric keypad 6 has a plurality of hard keys including hard keys of numbers of 0 to 9. The numeric keypad 6 may be operated mainly when the user inputs one or more numbers therethrough (e.g., when the user inputs a facsimile number of a transmission destination of facsimile data, or when the user inputs the number of copies for use of the copy function).

The back button 7 is a hard key that may be operated by the user to restore a current screen on the display 13 to a previous screen displayed immediately before the current screen. The home button 8 is a hard key that may be operated by the user to display the standby screen 25 on the display. The stop button 9 is a hard key that may be operated by the user to stop an operation in execution.

(1-3) Explanation of Standby Screen

The standby screen 25 is a screen in a tabbed form. Specifically, the standby screen 25 is configured to display thereon a tab screen corresponding to a selected one of a plurality of tabs. Each of the plurality of tabs is associated with a specific one of a plurality of tab screens.

Various kinds of information necessary for displaying the standby screen 25 are stored in the storage 12. For instance, the various kinds of information necessary for displaying the standby screen 25 contain image information for each tab and information on each icon included in an individual tab screen associated with each tab. Further, information on processes to be executed in response to various kinds of input operations being performed on the standby screen 25 via the input I/F 14 is stored in the storage 12.

As shown in FIG. 2, the standby screen 25 includes a tab display area 30 and a tab screen display area 36. Further, on the standby screen 25, an administrator button 28 is displayed. In the tab display area 30, up to four tabs are displayed. In the illustrative embodiment, a total number Nt of tabs is more than the maximum number (i.e., four) of tabs concurrently displayable on the standby screen 25. FIG. 2 shows an example in which a first tab 31, a second tab 32, a third tab 33, and a fourth tab 34, among Nt tabs from the first tab to an Nt-th tab, are displayed in the tab display area 30.

Each tab has a specific name shown thereon. A selected tab is displayed in a different mode from the other tabs. For instance, the selected tab may be displayed with a different color from the other tabs. Further, the selected tab may be displayed with a different size from the other tabs. Furthermore, the selected tab may be displayed with a specific decoration added thereto. FIG. 2 shows an example in which the first tab 31 is selected and displayed with a different color from the other tabs.

The individual tab screen associated with each tab includes a plurality of icons arranged thereon. In the illustrative embodiment, 8 icons are displayed on each single tab screen. In the tab screen display area 36 of the standby screen 25, a tab screen associated with a selected tab is displayed among the tab screens (i.e., a first tab screen to an Nt-th tab screen) each associated with a corresponding one of the Nt tabs from the first tab to the Nt-th tab. FIG. 2 shows an example in which the first tab screen 40 associated with the selected first tab 31 is displayed in the tab screen display area 36.

On the first tab screen 40, a first icon 41 to an eighth icon 48 are displayed. As will be described later, the type of each icon may be changed by an administrative right. On the first tab screen 40 exemplified in FIG. 2, the first icon 41 is a facsimile icon, the second icon 42 is a copy icon, the third icon 43 is a scan icon, the fourth icon is an unregistered icon, the fifth icon 45 is a setting menu icon, the sixth icon 46 is a security print icon, the seventh icon 47 is a 2-in-1 ID copy icon, and the eighth icon 48 is an unregistered icon.

A left button 26 and a right button 27 are displayed near both ends of the tab display area 30 of the standby screen 25. An arrangement order of the Nt tabs in the left-to-right direction is previously determined. When one or more other tabs are arranged (hidden) on the left of the currently-displayed four tabs, the one or more other tabs may be displayed by tapping the left button 26 and scrolling rightward the tabs to be displayed. Conversely, when one or more other tabs are arranged (hidden) on the right of the currently-displayed four tabs, the one or more other tabs may be displayed by tapping the right button 27 and scrolling leftward the tabs to be displayed.

By tapping a tab associated with an intended tab screen, the user may switch the tab screen associated with the currently-selected tab to the intended tab screen associated with the tapped tab. When a tab different from the currently-selected tab is tapped, the tapped tab is brought into a selected state, and a tab screen associated with the newly-selected tab is displayed in the tab screen display area 36 of the standby screen 25.

As shown in the left area of FIG. 3, suppose for instance that the first tab screen 40 associated with the first tab 31 is displayed in the tab screen display area 36 of the standby screen 25. In this state, for instance, when the second tab 32 of which the tab name is "Basic Functions 2" is tapped, as shown in the right area of FIG. 3, the selected tab is switched from the first tab 31 to the second tab 32, and then, the second tab screen 50 associated with the selected second tab 32 is displayed in the tab screen display area 36.

On the second tab screen 50, 8 icons of a first icon 51 to an eighth icon 58 are displayed. On the second tab screen 50, the first icon 51 is a media print icon, the second icon 52 is a cloud icon, the third icon 53 is a convenient tool icon, and the fifth icon 55 is a below-mentioned shortcut icon for scan-to-file function. The fourth icon 54 and the sixth to eighth icons 56 to 58 are unregistered icons.

Icons included in tab screens to be displayed on the standby screen 25 are roughly classified into three types of icons, i.e., function execution icons, setting icons, and unregistered icons. Each of the function execution icons is an icon for executing a corresponding one of the specified functions executable by the function execution apparatus 10, that is, an icon with which the corresponding function is registered. Each of the setting icons is an icon for configuring settings for one or more specific setting items, that is, an icon with which a list of the one or more specific items to be set is registered. Each of the unregistered icons is an icon with which no function or no setting item is registered, that is, an icon with which the user is allowed to newly register an arbitrary function or setting item.

The function execution icons are further classified into two types of icons, i.e., specified function icons and shortcut icons. Each of the specified function icons is an icon for executing a corresponding one of the specified functions (e.g., the scanning function, the printing function, the copy function, the facsimile function, a web service function, and a convenient function) executable by the function execution apparatus 10, that is, an icon with which the corresponding function to be executed is registered. The specified function icons are previously registered at the time of shipping the function execution apparatus 10. Setting values registered with each specified function icon are predetermined default values. Nonetheless, the user may confirm and change the default values before causing the function execution apparatus 10 to execute a corresponding function by tapping a specified function icon.

With each of the shortcut icons, registered is a shortcut function that enables the function execution apparatus 10 (more specifically, the controller 11) to execute a corresponding one of the specified functions executable by the function execution apparatus 10. The shortcut icons are not previously registered at the time of shipment of the function execution apparatus 10. Each of the shortcut icons is generated to replace an unregistered icon therewith in response to a shortcut function for a specified function being arbitrarily registered with the unregistered icon.

Each of the specified function icons has an initial value previously determined for each setting item. Meanwhile, regarding each of the shortcut icons, the user may arbitrarily set and register a target function and what setting conditions the target function is to be executed under.

It is noted that the user may register an arbitrary shortcut function with an unregistered icon and change the unregistered icon to a new shortcut icon. Further, the user may register an arbitrary function with an unregistered icon and change the unregistered icon to a new specified function icon. Moreover, the user may register one or more arbitrary setting items with an unregistered icon and change the unregistered icon to a new setting icon.

The shortcut icons are further classified into two types of icons, i.e., regular shortcut icons and one-touch shortcut icons. Each of the regular shortcut icons is configured to, when tapped, once display a particular confirmation screen without beginning a registered shortcut function immediately after being tapped.

When a regular shortcut icon is tapped, a corresponding confirmation screen is displayed. Thereby, the user may confirm and change setting values for a registered shortcut function via the confirmation screen. Then, after the confirmation screen is displayed, the registered shortcut function is started in response to a particular operation to start the registered shortcut function being performed.

Meanwhile, each of the one-touch shortcut icons is configured to, after tapped, immediately start a registered shortcut function with no need for a user input operation.

On the standby screen 25 (see FIG. 2 and the left area of FIG. 3) on which the first tab screen 40 associated with the first tab 31 is displayed, the facsimile icon (i.e., the first icon 41) is a specified function icon for executing the facsimile function. The copy icon (i.e., the second icon 42) is a specified function icon for executing the copy function. The scan icon (i.e., the third icon 43) is a specified function icon for executing the scanning function. The setting menu icon (i.e., the fifth icon 45) is a setting icon for configuring settings for at least one setting item.

The security print icon (i.e., the sixth icon 46) is a specified function icon for performing security printing of the printing function. The security printing is a specific execution mode of the printing function. Specifically, the security printing is a function in which after a print job with a password is transmitted from an information processing device (e.g., a personal computer and a smartphone) to the function execution apparatus 10, when the function execution apparatus 10 accepts an input of the same password, the function execution apparatus 10 performs printing according to the print job.

The 2-in-1 ID copy icon (i.e., the seventh icon 47) is a specified function icon for performing 2-in-1 ID copy of the copy function. The 2-in-1 ID copy is a specific execution mode of the copy function. Specifically, the 2-in-1 ID copy is a function in which the function execution apparatus 10 scans images of both sides of a card-size document sheet and print the scanned images to be allocated on one side of a single recording sheet.

Further, on the standby screen 25 (see the right area of FIG. 3) on which the second tab screen 50 associated with the second tab 32 is displayed, the media print icon (i.e., the first icon 51) is a specified function icon for performing media printing of the printing function. The media printing is a specific execution mode of the printing function. Specifically, the media printing is a function in which the function execution apparatus 10 prints an image based on image data that is stored in a storage medium connected with the media I/F 17.

The cloud icon (i.e., the second icon 52) is a specified function icon for using the web service function. The web service function is a function for using web services provided via a network such as the Internet. For instance, the web services include uploading images and/or files available on the network, browsing the uploaded images and/or files, and downloading the uploaded images and/or files.

The convenient tool icon (i.e., the third icon 53) is a specified function icon for using the convenient tool function. The convenient tool function is a function for accessing a particular tool contents providing site via a network such as the Internet and using various services provided by the tool contents providing site.

The shortcut icon (i.e., the fifth icon 55) for scan-to-file function is a shortcut icon with which a shortcut function for a below-mentioned scan-to-file function is registered.

(1-4) Overview of Functions Executable by Function Execution Apparatus

Explanations will be provided of the functions executable by the function execution apparatus 10 and specific execution modes of the functions. When the user wishes to use the copy function, the user sets a document sheet on the document table (not shown) or the ADF (not shown) of the function execution apparatus 10, and taps the copy icon (e.g., in the example shown in FIG. 3, the second icon 42 on the first tab screen 40) on the standby screen 25. When the copy icon is tapped, the copy function is started. Specifically, a copy setting screen is displayed on the display 13. On the copy setting screen, default values for various setting items necessary for executing the copy function are displayed. Thus, the user may confirm and change a setting value for each of the setting items for the copy function, via the copy setting screen. When a start button displayed on the copy setting screen is pressed, the copy function is executed based on the setting values accepted via the copy setting screen.

While the copy function is in execution, a pseudo standby screen 80 shown in FIG. 4 is displayed on the display 13. When the copy function in execution is terminated, the screen displayed on the display 13 is again switched from the pseudo standby screen 80 to the standby screen 25. On the pseudo standby screen 80, a function-in-execution name 81 is displayed. The function-in-execution name 81 represents a function currently in execution. Further, on the pseudo standby screen 80, a facsimile icon 86, a copy icon 87, and a scan icon 88 are displayed as specified function icons.

By tapping one of the specified function icons 86 to 88 displayed on the pseudo standby screen 80, the user may start a function associated with the tapped specified function icon, in parallel with the copy function currently in execution. In this case, functions executable in parallel with a currently-executed function are not limited to functions other than the currently-executed function, but may include the same function as the currently-executed function. For instance, by tapping the copy icon 87 on the pseudo standby screen 80 while the copy function is in execution, the user may configure settings for a copy function to be next executed.

For instance, by tapping the facsimile icon 86 on the pseudo standby screen 80, the user may perform input operations necessary for transmission of facsimile data in parallel with the copy function in execution. At this time, even while the function execution apparatus 10 is printing a scanned image of a document on a recording sheet after completion of image scanning of the document, the user may set a document and perform facsimile transmission of a scanned image of the set document.

When the user wishes to use the scanning function, the user sets a document sheet on the document table (not shown) or the ADF (not shown) of the function execution apparatus 10, and taps the scan icon (e.g., in the example shown in FIG. 3, the third icon 43 on the first tab screen 40) on the standby screen 25. When the scan icon is tapped, the scanning function is started. Specifically, a scan menu screen is displayed on the display. The scan menu includes selectable menu items (i.e., optional scanning functions) such as "scan-to-media" and "scan-to-file."

When an optional scanning function the user wishes to execute is selected via the scan menu screen, a setting screen for the selected optional scanning function is displayed. On the setting screen, default setting values for various setting items necessary for executing the selected optional scanning function are displayed. The user may confirm and change the setting values via the setting screen. Then, when a start button displayed on the setting screen is tapped, the scanning function is executed based on the setting values accepted via the setting screen.

In the same manner as when the copy function is in execution, while the scanning function is in execution as well, the pseudo standby screen 80 shown in FIG. 4 is displayed on the display 13. Then, by tapping one of the specified function icons 86 to 88 displayed on the pseudo standby screen 80, the user may start a function associated with the tapped specified function icon, in parallel with the scanning function currently in execution.

When the user wishes to use the facsimile function, the user taps the facsimile icon (e.g., in the example shown in FIG. 3, the first icon 41 on the first tab screen 40) on the standby screen 25. When the facsimile icon is tapped, a procedure for facsimile transmission is started. Specifically, a facsimile transmission setting screen is displayed. On the facsimile transmission setting screen, current setting values for various setting items (e.g., a document size and an image quality level) necessary for facsimile transmission, and an entry field in which a facsimile number is input, are displayed. By inputting a facsimile number and tapping a start button via the facsimile transmission setting screen, the user may transmit facsimile data. Even while the facsimile data is being transmitted, the pseudo standby screen 80 is displayed, and the user may tap one of the specified function icons 86 to 88 on the pseudo standby screen 80, thereby starting a function associated with the tapped specified function icon.

In the illustrative embodiment, the facsimile function has at least two operational modes, including a facsimile-specific mode and a manual mode, as reception modes for receiving facsimile data. The user may set one of the at least two operational modes as a reception mode.

The manual mode is set in a case where the function execution apparatus 10 is connected with the external telephone 110 such that both facsimile communication and telephone communication may be used. Specifically, in the manual mode, when receiving an incoming call via the communication network 100, the function execution apparatus 10 sounds an incoming call tone a set number of times. In response to the external telephone 110 being brought into an off-hook state while the function execution apparatus 10 is sounding the incoming call tone, the external telephone 110 is connected with the communication network 100. At this time, when the incoming call is a telephone call, the user may perform external-network voice communication with the external telephone 110. Meanwhile, when the incoming call is a facsimile call, the user may receive facsimile data by tapping the facsimile icon (e.g., the first icon 41) and designating facsimile reception in accordance with screen guidance on the display 13.

Subsequently, the shortcut function will be described. As described above, the user may arbitrarily register the shortcut function with an unregistered icon. For instance, the shortcut function may be registered for the aforementioned specified functions such as the facsimile function, the copy function, the scanning function, the web service function, and the convenient tool function.

For instance, when the user wishes to register the shortcut function for the copy function, first, the user taps an unregistered icon included in a tab screen associated with one of the tabs. When an unregistered icon is tapped, a list of registrable functions and registrable setting items is displayed. The user may select one of the registrable functions or one of the registrable setting items from the displayed list.

When one of the registrable setting items is selected, a setting icon associated with the selected setting item is newly generated. Namely, the tapped unregistered icon is changed to the setting icon with which the selected setting item is registered. Afterward, by tapping the newly-generated setting icon, the user may confirm and change a setting value for the registered setting item.

Meanwhile, when one of the registrable functions is selected, a selection screen is displayed. The selection screen is a screen to prompt the user to make a selection as to whether the selected function is to be registered with a specified function icon or a shortcut icon.

When the option that the selected function is to be registered with a specified function icon is selected, a specified function icon associated with the selected function is newly generated. Namely, the tapped unregistered icon is changed to the specified function icon with which the selected function is registered. In the illustrative embodiment, the same specified function icon as a specified function icon that has been already provided since the shipment of the function execution apparatus 10 may be newly registered.

Meanwhile, when the option that the selected function is to be registered with a specified function icon is selected, a setting screen is displayed. The setting screen is configured to prompt the user to set specific execution conditions for executing the selected function. The user may arbitrarily set, via the setting screen, specific execution conditions for the selected function, i.e., setting values for various setting items necessary for executing the selected function. Then, when a user operation, which represents completion of setting of the specific execution conditions for the selected function, is performed, a shortcut icon for causing the function execution apparatus 10 to execute the selected function under the specific execution conditions is generated. Namely, the tapped unregistered icon is changed to the shortcut icon with which the selected function is registered. Afterward, by tapping the newly-generated shortcut icon, the user may easily cause the function execution apparatus 10 to execute the registered function in accordance with the registered specific execution conditions.

It is noted that when the user registers a shortcut function for a selected function, the user may make a selection as to whether the shortcut function is to be registered as a regular shortcut function or a one-touch shortcut function.

The regular shortcut function is such a shortcut function that a registered function is not started immediately even after a corresponding shortcut icon is tapped and that at least one more user operation is required to start the registered function. In the illustrative embodiment, when a shortcut icon with which a regular shortcut function is registered is tapped, a confirmation screen is displayed. The confirmation screen contains setting values for the registered shortcut function and an OK button. When the OK button is tapped on the confirmation screen, the registered shortcut function is executed.

The one-touch shortcut function is such a shortcut function that when a corresponding shortcut icon is tapped, a registered function is automatically started with no need for a further user operation. On the standby screen 25 with the second tab screen 50 displayed thereon as shown in the right area of FIG. 3, the fifth icon 55 is a shortcut icon with which the regular shortcut function is registered. As exemplified in FIG. 3, to a shortcut icon with which the regular shortcut function is registered, a regular shortcut mark 91 is added. The regular shortcut mark 91 represents that the regular shortcut function is registered with the shortcut icon to which the regular shortcut mark 91 is added.

Further, on a below-mentioned standby screen setting screen 60 shown in FIG. 5B, an eighth icon 48 included in a first tab screen 40 associated with a first tab 31 is a shortcut icon with which the one-touch shortcut function is registered. To the shortcut icon with which the one-touch shortcut function is registered, as exemplified in FIG. 5B, a one-touch shortcut mark 92 is added. The one-touch shortcut mark 95 represents that the one-touch shortcut function is registered with the shortcut icon to which the one-touch shortcut mark 95 is added.

(1-5) Explanation of Administration

As shown in FIGS. 2 and 3, the administrator button 28 is displayed on the standby screen 25. When the administrator button 28 is tapped, an authentication screen for authenticating an administrator is displayed. When particular information such as a password is input via the authentication screen, an authentication process is performed.

The authentication process is a process to determine whether particular authentication conditions are satisfied. The authentication conditions include a requirement that the input password needs to be coincident with a previously-registered specific password. When the authentication conditions are satisfied in the authentication process, a standby screen setting screen 60 exemplified in FIG. 5A is displayed on the display 13. The standby screen setting screen 60 is a screen via which the user is allowed to edit each icon included in an individual tab screen associated with each tab.

As shown in FIG. 5A, the standby screen setting screen 60 has a tab display area 30, a tab screen display area 36, and an edit button display area 61. Contents displayed on the tab display area 30 and the tab screen display area 36 of the standby screen setting screen 60 are basically and substantially identical to the contents displayed on the tab display area 30 and the tab screen display area 36 of the standby screen 25. Further, in the same manner as exemplified as an operation of switching tab screens on the standby screen 25, the user may switch, on the tab screen setting screen 60, the currently-selected tab 31 to another tab associated with an intended tab screen, thereby switching the currently-displayed tab screen 40 to the intended tab screen.

In the edit button display area 61, icon edit buttons are displayed. Each of the icon edit buttons is for performing a specific kind of editing operation to edit a part or all of icons included in all the tab screens respectively associated with all the tabs. Specifically, in the illustrative embodiment, as the icon edit buttons, a leftward movement button 62, a rightward movement button 63, a replacement button 64, a deletion button 65, and a collective deletion button 66 are displayed.

The collective deletion button 66 is for collectively deleting all icons included in all the tab screens respectively associated with all the tabs. When the collective deletion button 66 is tapped in a state where any icon is not selected, a confirmation screen is displayed to confirm whether the user really wishes to collectively delete all icons included in all the tab screens respectively associated with all the tabs. When the user performs, on the confirmation screen, an operation to affirm that the user really wishes to collectively delete all icons included in all the tab screens respectively associated with all the tabs, all icons included in all the tab screens respectively associated with all the tabs are deleted. In other words, all icons included in all the tab screens respectively associated with one of all the tabs are changed to unregistered icons.

The deletion button 65 is a button for deleting a selected one of icons other than unregistered icons. After a target icon to be deleted is tapped and brought into a selected state, in response to the deletion button 65 being tapped, the selected icon is deleted. In other words, the selected icon is changed to an unregistered icon.

The replacement button 64 is a button for replacing positions of two icons with each other. A replacement procedure may be as follows. First, an icon (which is not an unregistered icon) of two icons to be positionally replaced is tapped and brought into a selected state. In this state, the replacement button 64 is tapped. Afterward, when the other icon (which may be an unregistered icon) of the two icons to be positionally replaced is tapped, the positions of the two icons are replaced with each other. It is noted that, after tapping the replacement button 64, by switching from one tab to another and selecting an icon included in a tab screen for the "another tab," the user may replace icons between the different tabs.

The rightward movement button 63 is a button for moving an icon rightward. When a target icon is moved rightward, an icon that has been originally adjacent to the right of the target icon moves leftward. Thus, in other words, the rightward movement buttons 63 is a button for positionally replacing mutually-adjacent two icons in the left-to-right direction with each other.

A target icon is moved rightward in accordance with the following procedure. First, the target icon to be moved is tapped and brought into a selected state. In this state, when the rightward movement button 63 is tapped, the selected icon and an icon adjacent to the right of the selected icon are positionally replaced with each other. It is noted that in response to the rightward movement buttons 63 being tapped, two icons may be positionally replaced between different tabs. For instance, when an eighth icon, which is a rightmost icon, on an n-th tab screen is selected as a target icon to be moved, and the rightward movement button 63 is tapped, the selected icon is moved to a position of a first icon, which is a leftmost icon, on an (n+1)-th tab screen that is a tab screen subsequent to the n-th tab screen. Instead, an icon that has been originally in the position of the first icon on the (n+1)-th tab screen moves to the position of the eighth icon on the n-th tab screen.

The leftward movement button 62 is a button for moving an icon leftward. When a target icon is moved leftward, an icon that has been originally adjacent to the left of the target icon moves rightward. Thus, in other words, the leftward movement buttons 62 is a button for positionally replacing mutually-adjacent two icons in the left-to-right direction with each other, in the same manner as the rightward movement button 63.

A target icon is moved leftward in accordance with the following procedure. First, the target icon to be moved is tapped and brought into a selected state. In this state, when the leftward movement button 62 is tapped, the selected icon and an icon adjacent to the left of the selected icon are positionally replaced with each other. It is noted that in response to the leftward movement buttons 62 being tapped, two icons may be positionally replaced between different tabs. For instance, when a first icon, which is a leftmost icon, on the n-th tab screen is selected as a target icon to be moved, and the leftward movement button 62 is tapped, the selected icon is moved to a position of an eighth icon, which is a rightmost icon, on an (n−1)-th tab screen that is a tab screen just prior to the n-th tab screen. Instead, an icon that has been originally in the position of the eighth icon on the (n−1)-th tab screen moves to the original position of the first icon on the n-th tab screen.

Specific examples of various kinds of operations to edit icons will be described with reference to FIGS. 5A, 5B, 6A, and 6B. FIG. 5A is an example of the standby screen setting screen 60 displayed after the authentication process is performed in response to the administrator button 28 being tapped on the standby screen 25, which is configured as shown in FIG. 3. FIG. 5A shows a state immediately after the standby screen 25 shown in FIG. 3 has been switched to the standby screen setting screen 60. The standby screen setting screen 60 shown in FIG. 5A has the same contents included in an individual tab screen for each tab as the contents of the standby screen 25 shown in FIG. 3. After the standby screen setting screen 60 is displayed, by using the icon edit buttons 62 to 66, the user may perform the aforementioned various kinds of operations to edit icons.

FIG. 5B shows a state where the security print icon (i.e., the sixth icon 46) and the 2-in-1 ID copy icon (i.e., the seventh icon 47) on the first tab screen 40 for the first tab 31 and the media print icon (i.e., the first icon 51) on the second tab screen 50 for the second tab 32 are deleted using the deletion button 65.

Further, FIG. 5B shows a state where the eighth icon 48 has been changed to a shortcut icon in response to the shortcut function being newly registered with an unregistered icon as the eighth icon 48 on the first tab screen 40 for the first tab 31 in FIG. 5A. To the shortcut icon (i.e., the eighth icon 48), the aforementioned one-touch shortcut mark 92 is added, thereby representing that the one-touch shortcut function is registered with the shortcut icon.

It is noted that the user may newly register an unregistered icon as a shortcut icon, a specified function icon, or a setting icon, on both the standby screen 25 and the standby screen setting screen 60.

FIG. 6A shows a state where a shortcut icon as the eighth icon 48, with which the one-touch shortcut function is registered, on the first tab screen 40 for the first tab 31 in FIG. 5B has been moved leftward using the leftward movement button 62. At this time, instead, an unregistered icon, placed in a position of the seventh icon 47 on the first tab screen 40 for the first tab 31 in FIG. 5B, has been moved to the position of the eighth icon 48.

Further, FIG. 6A shows a state where a shortcut icon as the fifth icon 55, with which the regular shortcut function is registered, on the second tab screen 50 for the second tab 32 in FIG. 5B has been replaced with an unregistered icon as the first icon 51 positioned on an upper side of the fifth icon 55, using the replacement button 64.

FIG. 6B shows a state where a shortcut icon as the first icon 51 positioned leftmost, with which the regular shortcut function is registered, on the second tab screen 50 for the second tab 32 in FIG. 6A has been moved leftward using the left movement button 62. When the first icon 51 positioned leftmost on the second tab screen 50 for the second tab 32 is selected, and then the leftward movement button 62 is tapped, the selected icon (i.e., the first icon 51) is replaced over the tab with the eighth icon 48 positioned rightmost on the first tab screen 40 for the first tab 31, which is a tab screen just prior to the second tab screen 50.

Further, FIG. 6B shows a state where a web service icon as the second icon 52 on the second tab screen 50 for the second tab 32 has been replaced with an unregistered icon as the fourth icon 44 on the first tab screen 40 for the first tab 31, using the replacement button 64. Namely, FIG. 6B shows an example of icons replaced over the tab between different tab screens.

After various kinds of edit operations have been performed on the standby screen setting screen 60, in response to the home button 8 being pressed, the standby screen 25 is displayed on the display 13. The standby screen 25 displayed at this time has contents reflecting results of the various kinds of edit operations performed on the standby screen setting screen 60.

Thus, by performing various kinds of edit operations on the standby screen setting screen 60, the user may customize an individual tab screen associated with each tab in various fashions. Namely, the user may freely and flexibly determine what kinds of icons are to be placed on each individual tab screen.

(1-6) Supplemental Explanation of Pseudo Standby Screen

When a particular one of the specified functions starts being executed, the pseudo standby screen 80 as shown in FIG. 4 is displayed during the execution of the particular specified function. Further, when receiving an incoming call of facsimile data while the standby screen 25 is being displayed, the function execution apparatus 10 starts performing a process of receiving the facsimile data as a function included in the facsimile function. Thereby, the pseudo standby screen 80 is displayed.

In the illustrative embodiment, on the pseudo standby screen 80, the facsimile icon 86, the copy icon 87, and the scan icon 88 of the specified function icons are displayed. Thereby, even though a particular one of the specified functions is in execution, the function execution apparatus 10 may execute one of the facsimile function, the copy function, and the scanning function in parallel with the particular specified function. It is noted that the number and kinds of specified function icons to be displayed on the pseudo standby screen 80 may be determined appropriately as needed.

As described above, with the function execution apparatus 10 of the illustrative embodiment, the user may perform, on the standby screen setting screen 60, various kinds of edit operations (e.g., deleting and moving) to edit each icon (i.e., each icon included in an individual tab screen associated with each tab) to be displayed on the standby screen 25. Therefore, with the function execution apparatus 10, the user may delete a facsimile icon as the first icon 41 included in the first tab screen 40 as shown in the upper area of FIG. 7, on the standby screen 25.

Here, suppose for instance that a facsimile-specific mode is set as a reception mode for receiving facsimile data. The facsimile-specific mode is a reception mode in which in response to receiving an incoming call of facsimile data, the function execution apparatus 10 automatically receives the facsimile data and stores the received data into the storage 12 with no need for any user operation. On the first tab screen 40 shown in the upper area of FIG. 7, a reception mode setting icon is registered as the fourth icon 44. The reception mode setting icon is a setting icon for making a transition to a screen for setting a reception mode of the facsimile function. As shown in FIG. 7, a currently-set reception mode is displayed on the reception mode setting icon.

When an edit operation to delete the facsimile icon as the first icon 41 on the first tab screen 40, as shown in the middle area of FIG. 7, the facsimile icon, which has existed as the first icon 41, is deleted from the first tab screen 40. Instead, an unregistered icon is displayed in the position of the first icon 41. Thereby, the user is not allowed to transmit facsimile data. Nonetheless, when the reception mode is set to the facsimile-specific mode, even if the facsimile icon is deleted from the standby screen 25, the function execution apparatus 10 automatically receives facsimile data.

When the facsimile icon is deleted from the standby screen 25 in a case where the reception mode is set to the facsimile-specific mode, the facsimile icon 86 is not displayed on the pseudo standby screen 80 as well, as shown in the lower area of FIG. 7. Therefore, when wishing to ban transmission of facsimile data, the administrator may bring the function execution apparatus 10 into a state where the apparatus 10 is not allowed to transmit facsimile data, by deleting the facsimile icon from the standby screen 25.

However, even though the facsimile icon is deleted from the standby screen 25, when the reception mode for receiving facsimile data is set to the manual mode, the facsimile icon 86 is displayed on the pseudo standby screen 80.

Specifically, with respect to the standby screen 25 having the first tab screen 40 shown in the upper area of FIG. 8, when an edit operation to delete the facsimile icon as the first icon 41 included in the first tab screen 40 is performed on the standby screen setting screen 60, the facsimile icon, which has existed as the first icon 4, is deleted from the first tab screen 40, as shown in the middle area of FIG. 8. Instead, an unregistered icon is displayed in the position of the first icon 41.

At this time, suppose that the manual mode is set as a reception mode for receiving facsimile data. The manual mode is a reception mode in which when receiving an incoming call of facsimile data, the function execution apparatus 10 requires a user operation to the facsimile icon. On the first tab screen 40 shown in each of the upper and middle areas of FIG. 8, the reception mode setting icon registered as the fourth icon 44 represents that the currently-set reception mode is the manual mode.

When receiving an incoming call of facsimile data while the standby screen 25 is being displayed, the controller 11 starts a process to receive the facsimile data as a function included in the facsimile function. At this time, the screen displayed on the display 13 is switched from the standby screen 25 to the pseudo standby screen 80. In this case, the facsimile icon is deleted from the standby screen 25, whereas the facsimile icon 86 is displayed on the pseudo standby screen 80, as shown in the lower area of FIG. 8. Therefore, the user may normally receive the facsimile data in accordance with the manual mode by tapping the facsimile icon 86 on the pseudo standby screen 80.

Even though the facsimile icon is deleted from the standby screen 25, when the reception mode is the manual mode, the facsimile icon 86 is displayed on the pseudo standby screen 80. In this case, nonetheless, the user is allowed to merely receive facsimile data by tapping the facsimile icon 86 on the pseudo standby screen 80, but is not allowed to transmit facsimile data even when tapping the facsimile icon 86. However, transmission of facsimile data may not necessarily be forbidden. The function execution apparatus 10 may be configured to, when the facsimile icon 86 is displayed on the pseudo standby screen 80, transmit facsimile data in response to the facsimile icon 86 being tapped.

In the illustrative embodiment, as described above, when all of function execution icons regarding a particular specified function are deleted, in principle, a specified function icon associated with the particular specified function is not displayed on the pseudo standby screen 80.

With respect to a specified function set in such a manner that a specified function icon thereof is displayed on the pseudo standby screen 80, when at least one function execution icon associated with the specified function exists somewhere on all the tab screens, the specified function icon of the specified function is displayed on the pseudo standby screen 80.

Suppose for instance that the copy icon as the second icon 42 is deleted from the standby screen 25 shown in the left area of FIG. 3. In this case, although the copy icon is deleted, the 2-in-1 ID copy icon as the seventh icon 47, which is a function execution icon for the copy function, still remains. In such a case, the copy icon 87 is displayed on the pseudo standby screen 80. When the 2-in-1 ID copy icon is deleted in addition to the copy icon, and thereby no function execution icon for the copy function exists on any of the tab screens, the copy icon 87 is not displayed on the pseudo standby screen 80.

(1-7) Explanation of Main Control Process

Subsequently, a main control process will be described with reference to FIGS. 9A and 9B. The main control process is a process to be performed by the controller 11 to execute the aforementioned various functions. When the function execution apparatus 10 is powered on and booted in response to the power button 5 being pressed, the controller 11 begins to execute the main control process shown in FIGS. 9A and 9B.

After starting the main control process shown in FIGS. 9A and 9B, in S110, the controller 11 obtains standby screen information. Specifically, the controller 11 obtains, from the storage 12, information regarding the standby screen 25 to be displayed on the display 13. In S120, the controller 11 controls the display 13 to display the standby screen 25, based on the standby screen information obtained in S110. It is noted that initial values for tab screens, such as a tab screen to be first displayed on the standby screen 25 after the function execution apparatus 10 is booted, a tab screen to be displayed on the standby screen 25 after execution of a function is terminated, and a tab screen to be displayed on the standby screen 25 in response to the home button 8 being pressed, may be determined appropriately as needed. In the illustrative embodiment, for instance, the initial values for tab screens may be set to the first tab screen 40 associated with the first tab 31.

In S130, the controller 11 determines whether the administrator button 28 on the standby screen 25 has been tapped. When determining that the administrator button 28 has been tapped (S130: Yes), the controller 11 performs the aforementioned authentication process (S140). Then, when the authentication conditions are satisfied (e.g., an input password is coincident with a previously-registered specific password), and the authentication process is successfully done, the controller 11 controls the display 13 to display the standby screen setting screen 60 (S150).

In S160, the controller 11 performs a display edit process. Specifically, when one or more edit operations are performed using the icon edit buttons 62 to 66 displayed in the edit button display area 61 on the standby screen setting screen 60, the controller 11 performs a display edit process (e.g., moving and/or deleting icons) according to the edit operations. The standby screen information stored in the storage 12 is updated in response to the display edit process being performed in S160.

In S170, the controller 11 determines whether the home button 8 has been pressed. When determining that the home button 8 has not been pressed (S170: No), the controller 11 goes back to S160, and continues to display the standby screen setting screen 60. In this case, when one or more edit operations are performed using the icon edit buttons 62 to 66 on the standby screen setting screen 60, the controller 11 performs a display edit process according to the edit operations. Meanwhile, when determining that the home button 8 has been pressed (S170: Yes), the controller 11 goes back to S110. After S110, the controller 11 again controls the display 13 to display the standby screen 25 in S120.

When determining that the administrator button 28 has not been tapped (S130: No), the controller 11 goes to S180. In S180, the controller 11 determines whether the controller 11 has detected an incoming call of facsimile data. When determining that the controller 11 has detected an incoming call of facsimile data (S180: Yes), the controller 11 goes to S250.

In S250, the controller 11 determines whether the facsimile icon, which is one of the specified function icons, is deleted from the standby screen 25. In the illustrative embodiment, as shown in FIG. 3, the facsimile icon is previously registered as the first icon 41 on the first tab screen 40. However, as described above, the facsimile icon may be deleted by an edit operation to delete it.

When determining that the facsimile icon is not deleted from the standby screen 25 (S250: No), the controller 11 goes to S270. Meanwhile, when determining that the facsimile icon is deleted from the standby screen 25 (S250: Yes), the controller 11 goes to S260. In S260, the controller 11 determines whether the reception mode is set to the manual mode. When determining that the reception mode is set to the manual mode (S260: Yes), the controller 11 goes to S270.

In S270, the controller 11 controls the display 13 to display the pseudo standby screen 80. At this time, as exemplified in the lower area of FIG. 8, the controller 11 controls the display 13 to display the facsimile icon 86 on the pseudo standby screen 80. Thereafter, in S290, the controller 11 performs an incoming call responding process. When advancing from S270 to S290, in S290, specifically, the controller 11 waits until the facsimile icon 86 on the pseudo standby screen 80 is tapped by the user, and when the facsimile icon 86 is tapped, the controller 11 performs a facsimile data receiving process to receive the facsimile data. When receiving the facsimile data and storing the received facsimile data into the storage 12, the controller 11 terminates the incoming call responding process. Afterward, the controller 11 goes to S110.

When determining that the reception mode is not set to the manual mode but is set to the facsimile-specific mode (S260: No), the controller 11 goes to S280. In S280, the controller 11 controls the display 13 to display the pseudo standby screen 80. At this time, as exemplified in the lower area of FIG. 7, the controller 11 controls the display 13 not to display the facsimile icon 86 on the pseudo standby screen 80. After S280, the controller 11 performs the incoming call responding process (S290). When advancing from S280 to S290, in S290, specifically, the controller 11 automatically performs the facsimile data receiving process with no need for any user operation. When receiving the facsimile data and storing the received facsimile data into the storage 12, the controller 11 terminates the incoming call responding process. Afterward, the controller 11 goes to S110.

When determining that the controller 11 has not detected an incoming call of facsimile data (S180: No), the controller 11 goes to S190. In S190, the controller 11 determines whether an instruction to start copying has been issued. For instance, the instruction to start copying may be issued in response to an icon associated with the copy function being tapped on the standby screen 25. In the example of the standby screen 25 shown in FIG. 3, the copy icon and the 2-in-1 ID copy icon are associated with the copy function. Namely, in S190, when one of the copy icon and the 2-in-1 ID copy icon is tapped, the controller 11 determines that an instruction to start copying has been issued (S190: Yes).

When determining that an instruction to start copying has been issued (S190: Yes), the controller 11 controls the display 13 to display the pseudo standby screen 80 (S200). Thereafter, the controller 11 performs a process corresponding to a copy function associated with the tapped icon (i.e., the copy icon or the 2-in-1 ID copy icon) (S210). It is noted that when the reception mode for the facsimile function is the manual mode, the controller 11 controls the display 13 to display the facsimile icon 86 on the pseudo standby screen 80 displayed in S200. Meanwhile, when the reception mode for the facsimile function is the facsimile-specific mode, the controller 11 controls the display 13 not to display the facsimile icon 86 on the pseudo standby screen 80 displayed in S200.

Processes in S210 following S200 in which the pseudo standby screen 80 is displayed on the display 13, may include determining whether a specified function icon has been tapped on the pseudo standby screen 80, and when a specified function icon has been tapped, performing a specified function associated with the tapped specified function icon.

When determining that an instruction to start copying has not been issued (S190: No), the controller 11 goes to S220. In S220, the controller 11 determines whether an instruction to start a function other than the copy function has been issued. Specifically, the controller 11 determines whether an icon other than the icons associated with the copy function, among the icons displayed on the standby screen 25, has been tapped. The aforementioned "icon other than the icons associated with the copy function" may be a shortcut icon or a setting icon, as well as a specified function icon. When determining that an icon other than the icons associated with the copy function has been tapped (S220: Yes), the controller 11 goes to S210. In S210, the controller 11 performs a process corresponding to the tapped icon. Meanwhile, when determining that any icon other than the icons associated with the copy function has not been tapped (S220: No), the controller 11 goes to S230.

In S230, the controller 11 determines whether one of the tabs displayed on the standby screen 25 has been tapped. When determining that any of the tabs displayed on the standby screen 25 has not been tapped (S230: No), the controller 11 goes back to S130. Meanwhile, when determining that one of the tabs displayed on the standby screen 25 has been tapped (S230: Yes), the controller 11 goes to S240. In S240, the controller 11 performs a tab switching process. Specifically, the controller 11 brings the tapped tab into a selected state, and controls the display 13 to display a tab screen associated with the tab in the tab screen display area 36.

(1-8) Advantageous Effects of Illustrative Embodiment

In the illustrative embodiment, the function execution apparatus 10 is configured to concurrently display, on a single tab screen, one or more specified function icons, one or more shortcut icons, and one or more unregistered icons. Therefore, via the same single tab screen, with no need for switching tabs, the user may execute a specified function by tapping a corresponding specified function icon, newly generate a shortcut icon or another type of icon by tapping an unregistered icon, or execute a shortcut function by tapping a corresponding shortcut icon. Thus, according to the function execution apparatus 10 of the illustrative embodiment, it is possible to improve user-friendliness for selecting a target function to be executed, via a standby screen displayed in a tabbed form.

With the function execution apparatus 10 of the illustrative embodiment, the user may cause the apparatus 10 to display the standby screen setting screen 60 by an administrative right, and may perform, via the standby screen setting screen 60, various kinds of edit operations to edit icons to be displayed on the standby screen 25. Therefore, it is possible to attain a standby screen according to user's purpose of use and/or preference.

In the illustrative embodiment, the various kinds of edit operations executable via the standby screen setting screen 60 may include moving an icon rightward, moving an icon leftward, replacing icons with each other, deleting an icon, and collectively deleting all icons. Thereby, for instance, the user may delete unnecessary icons, place the same icon on a plurality of different tab screens, and change the positions of icons. Thus, it is possible to attain a standby screen further reflecting user's purpose of use and/or preference.

In the illustrative embodiment, when a specified function is started, the pseudo standby screen 80 is displayed on the display 13. As exemplified in FIG. 4, on the pseudo standby screen 80, the respective specified function icons 86, 87, and 88 associated with the facsimile function, the copy function, and the scanning function are displayed. By tapping one of the specified function icons 86, 87, and 88 on the pseudo standby screen 80, the user may execute another specified function in parallel with a function currently in execution.

When function execution icons associated with a particular specified function are deleted from all the tab screens, a specified function associated with the particular specified function is not displayed on the pseudo standby screen 80 as well. Therefore, when wishing to ban the use of a particular specified function, the user may delete all function execution icons associated with the particular specified function. Thereby, it is possible to effectively prevent the particular specified function from being unintentionally used by the user.

With respect to the facsimile function, when the reception mode is set to the manual mode, even though all of the function execution icons associated with the facsimile function are deleted, the facsimile icon 86 is displayed on the pseudo standby screen 80. Thereby, even though transmission of facsimile data is forbidden, the user is allowed to normally receive facsimile data in the manual mode.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

It may be freely and flexibly determined what types of icons are to be placed on a same single tab screen. For instance, only one type of icons, among the four types of icons, i.e., specified function icons, setting icons, shortcut icons, and unregistered icons, may be placed on a same single tab screen. Alternatively, two or more types of icons may be placed in a mixed manner on the same single tab screen. Further, for instance, in an initial state at the time of shipment of the function execution apparatus 10, the function execution apparatus 10 may be set to provide a standby screen with no icon displayed on any tab screen. In this case, the administrator and/or the user may freely and flexibly determine what types of icons are to be placed on each individual tab screen of the standby screen in the initial state.

In the aforementioned illustrative embodiment, the number of icons displayable on each individual tab screen is eight. Nonetheless, the number of icons displayable on each individual tab screen may be determined appropriately as needed. Further, it may be determined appropriately as needed where and how a plurality of icons are to be placed on each individual tab screen.

In the aforementioned illustrative embodiment, five kinds of edit operations, i.e., moving an icon leftward, moving an icon rightward, replacing icons with each other, deleting an icon, and collectively deleting all icons have been exemplified as various kinds of edit operations executable via the standby screen setting screen 60. Nonetheless, the various kinds of edit operations executable via the standby screen setting screen 60 may include different kinds of edit operations.

The total number Nt of the tabs may be changed. Specifically, for instance, when the total number Nt of the tabs is 10 at the time of shipment of the function execution apparatus 10, the total number Nt of the tabs may be increased to a number equal to or more than 11 or may be reduced to a number equal to or less than 9 by a user operation.

It may be determined appropriately as needed where tabs and icons are to be displayed on the standby screen 25. For instance, on the standby screen 25 shown in FIG. 2, the tab display area 30 and the tab screen display area 36 may be replaced upside down.

When one of the plurality of specified functions is started while the standby screen 25 is being displayed, the pseudo standby screen 80 may not be displayed depending on the kind of the started function. For instance, the function execution apparatus 10 may be configured to, when the scanning function is started while the standby screen 25 is being displayed, not display the pseudo standby screen 80.

The types and the number of icons to be displayed on the pseudo standby screen 80 may be determined appropriately as needed. For instance, a shortcut icon may be displayed on the pseudo standby screen 80. Further, the function execution apparatus 10 may be configured such that the administrator and/or the user may add and change icons to be displayed on the pseudo standby screen 80.

In the aforementioned illustrative embodiment, the specified functions such as the facsimile function, the scanning function, the copy function, the printing function, and the web service function have been exemplified as functions executable by the function execution apparatus 10 include. Nonetheless, the function execution apparatus 10 may be configured to execute functions other than the aforementioned functions. Further, the kinds and the number of functions executable by the function execution apparatus 10 may be determined appropriately as needed.

A plurality of functions executable by a single element in the aforementioned illustrative embodiment may be implemented by a plurality of elements. A single function of a single element in the aforementioned illustrative embodiment may be implemented by a plurality of elements. A plurality of functions of a plurality of elements in the aforementioned illustrative embodiment may be implemented by a single element. A single function executable by a plurality of elements in the aforementioned illustrative embodiment may be implemented by a single element. A part of the configurations exemplified in the aforementioned illustrative embodiment may be omitted.

Associations of elements exemplified in the aforementioned illustrative embodiment with elements to be defined according to aspects of the present disclosure will be exemplified below. Each unregistered icon may be an example of a "shortcut-registrable icon" according to aspects of the present disclosure. The administrator button 28 may be an example of an "administrator icon" according to aspects of the present disclosure. Any of the leftward movement button 62, the rightward movement button 63, and the replacement button 64 may be an example of a "position changing button" according to aspects of the present disclosure. Any of the deletion button 65 and the collective deletion button 66 may be an example of a "deletion button" according to aspects of the present disclosure. The regular shortcut mark 91 may be an example of a "first image" according to aspects of the present disclosure. The one-touch shortcut mark 92 may be an example of a "second image" according to aspects of the present disclosure. The process in S120 may be an example of a "standby screen display process" according to aspects of the present disclosure. The process in S150 may be an example of a "setting screen display process" according to aspects of the present disclosure. The process in S210 may be an example of an "icon operation responding process" according to aspects of the present disclosure. The process in S240 may be an example of a "tab screen switching process" according to aspects of the present disclosure. Any of the processes in S200, S270, and S280 may be an example of a "pseudo standby screen display process" according to aspects of the present disclosure. Any of the processes in S210 and S290 may be an example of a "parallel execution process" according to aspects of the present disclosure.

What is claimed is:

1. A function execution apparatus comprising:
a display;
a touch panel configured to detect an indicating operation to indicate a position on the display; and
a controller configured to execute a plurality of functions and perform a particular control process, the particular control process comprising:
a standby screen displaying process comprising:
controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively, wherein each of the tab screens includes a plurality of icons associated with a corresponding tab, and at least one of the tab screens includes a particular specified function icon and at least one of a shortcut-registrable icon and a shortcut icon, the particular specified function icon being previously registered as an icon for causing the controller to execute a particular function of the plurality of functions, each function being registered with a corresponding one of specified function icons, the shortcut-registrable icon being an icon with which a shortcut function is registrable, the shortcut function enabling the controller to execute a specific function of the plurality of functions under a specific execution condition, the shortcut icon being generated to replace the shortcut-registrable icon therewith in response to the shortcut function being registered with the shortcut-registrable icon, the shortcut icon being configured to, when operated, cause the controller to execute the shortcut function;

a tab screen switching process comprising:
when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area; and an icon operation responding process comprising:
when the particular specified function icon is displayed on the standby screen, in response to detecting, via the touch panel, an indicating operation to indicate the particular specified function icon, starting a process to execute the particular function registered with the specified function icon;
when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon; and
when the shortcut icon is displayed on the standby screen, in response to detecting, via the touch panel, an indicating operation to indicate the shortcut icon, starting a process to execute the shortcut function registered with the shortcut icon.

2. The function execution apparatus according to claim 1, wherein the standby screen includes an administrator icon, and
wherein the particular control process further comprises:
an authentication process comprising:
when the standby screen is displayed on the display, in response to detecting, via the touch panel, an indicating operation to indicate the administrator icon, determining whether a particular authentication condition is satisfied;
a setting screen display process comprising:
in response to determining in the authentication process that the particular authentication condition is satisfied, controlling the display to display a standby screen setting screen, the standby screen setting screen including a tab display area to display the plurality of tabs, a tab screen display area to display a tab screen associated with a selected tab of the plurality of tabs, and an edit button display area to display a plurality of icon edit buttons; and
a display edit process comprising:
when the standby screen setting screen is displayed on the display, in response to an edit operation being performed on the standby screen setting screen, performing at least one kind of icon editing for a part or all of icons included in the plurality of tab screens respectively associated with the plurality of tabs, in accordance with the edit operation, the edit operation including an indicating operation to indicate a particular icon edit button of the plurality of icon edit buttons, each icon edit button being associated with a specific kind of icon editing.

3. The function execution apparatus according to claim 2, wherein the plurality of icon edit buttons displayed on the edit button display area include at least one of a position changing button and a deletion button, the position changing button being configured to, when operated, cause the controller to change positions of selected icons, the deletion button being configured to, when operated, cause the controller to delete, from the standby screen, at least one of the icons included in the plurality of tab screens respectively associated with the plurality of tabs.

4. The function execution apparatus according to claim 3, wherein the particular control process further comprises:
a pseudo standby screen display process comprising:
in response to a particular function of the plurality of functions being started, controlling the display to display a pseudo standby screen, the pseudo standby screen including at least one of the specified function icons; and
when a specified function icon is deleted from the standby screen in the display edit process, controlling the display not to display the deleted specified function icon on the pseudo standby screen; and
a parallel execution process comprising:
in response to detecting, via the touch panel, an indicating operation to indicate a specified function icon on the pseudo standby screen, starting to execute a function associated with the indicated specified function icon, in parallel with the particular function currently in execution.

5. The function execution apparatus according to claim 4, wherein the plurality of functions include a facsimile function that enables the controller to transmit and receive facsimile data,
wherein the specified function icons include a facsimile icon configured to, when operated, cause the controller to execute the facsimile function,
wherein the facsimile function has a plurality of types of operational modes, any one of which is settable as a reception mode for receiving facsimile data, the plurality of types operational modes including a particular operational mode in which an indicating operation to indicate the facsimile icon needs to be detected via the touch panel to receive the facsimile data, and wherein the pseudo standby screen display process further comprises:
even though the facsimile icon is deleted in the display edit process, when the particular operational mode is set as the reception mode, controlling the display to display the facsimile icon on the pseudo standby screen.

6. The function execution apparatus according to claim 1, wherein the shortcut function is registrable as one of:
a first shortcut function that is executed in response to at least one more indicating operation being detected via the touch panel after detection of an indicating operation to indicate a first shortcut icon corresponding to the first shortcut function; and
a second shortcut function that is executed without need for another indicating operation after detection of an indicating operation to indicate a second shortcut icon corresponding to the second shortcut function,
wherein the first shortcut icon corresponding to the first shortcut function includes a first image, the first image representing that the first shortcut icon is associated with the first shortcut function, and
wherein the second shortcut icon corresponding to the second shortcut function includes a second image different from the first image, the second image representing that the second shortcut icon is associated with the second shortcut function.

7. The function execution apparatus according to claim 1, wherein the plurality of functions include at least one of:
a scanning function to scan an image of a document sheet and generate image data of the scanned image;
a copy function to print, on a recording sheet, the image scanned by the scanning function; and
a facsimile function to transmit and receive facsimile data.

8. The function execution apparatus according to claim 1, wherein the controller comprises:
a processor; and
a memory storing processor-executable instructions configured to, when executed by the processor, cause the processor to perform the particular control process.

9. The function execution apparatus according to claim 1, wherein the controller is further configured to control the display to concurrently display, on the at least one tab screen, the particular specified function icon and the at least one of the shortcut-registrable icon and the shortcut icon in such a manner that an intended icon is selected from among the particular specified function icon and the at least one of the shortcut-registrable icon and the shortcut icon, on the at least one tab screen with no need for switching a currently-selected tab to another tab.

10. The function execution apparatus according to claim 1, wherein the controller is further configured to control the display to concurrently display, on the at least one tab screen, the particular specified function icon, the shortcut-registrable icon and the shortcut icon in such a manner that an intended icon is selected from among the particular specified function icon, the shortcut-registrable icon and the shortcut icon, on the at least one tab screen with no need for switching a currently-selected tab to another tab.

11. A method implementable on a processor connected with a display and a touch panel configured to detect an indicating operation to indicate a position on the display, the method comprising:
controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively, wherein each of the tab screens includes a plurality of icons associated with a corresponding tab, and at least one of the tab screens includes a particular specified function icon and at least one of a shortcut-registrable icon and a shortcut icon, the particular specified function icon being previously registered as an icon for causing the processor to execute a particular function of a plurality of functions executable by the processor, each function being registered with a corresponding one of specified function icons, the shortcut-registrable icon being an icon with which a shortcut function is registrable, the shortcut function enabling the processor to execute a specific function of the plurality of functions under a specific execution condition, the shortcut icon being generated to replace the shortcut-registrable icon therewith in response to the shortcut function being registered with the shortcut-registrable icon, the shortcut icon being configured to, when operated, cause the processor to execute the shortcut function;
when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area;
when the particular specified function icon is displayed on the standby screen, in response to detecting, via the touch panel, an indicating operation to indicate the particular specified function icon, starting a process to execute the particular function registered with the specified function icon;
when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon; and
when the shortcut icon is displayed on the standby screen, in response to detecting, via the touch panel, an indicating operation to indicate the shortcut icon, starting a process to execute the shortcut function registered with the shortcut icon.

12. The method according to claim 11, further comprising:
controlling the display to concurrently display, on the at least one tab screen, the particular specified function icon and the at least one of the shortcut-registrable icon and the shortcut icon in such a manner that an intended icon is selected from among the particular specified function icon and the at least one of the shortcut-registrable icon and the shortcut icon, on the at least one tab screen with no need for switching a currently-selected tab to another tab.

13. The method according to claim 11, further comprising:
controlling the display to concurrently display, on the at least one tab screen, the particular specified function icon, the shortcut-registrable icon and the shortcut icon in such a manner that an intended icon is selected from among the particular specified function icon, the shortcut-registrable icon and the shortcut icon, on the at least one tab screen with no need for switching a currently-selected tab to another tab.

14. A non-transitory computer-readable medium storing computer-readable instructions that are executable by a processor connected with a display and a touch panel configured to detect an indicating operation to indicate a position on the display, the instructions being configured to, when executed by the processor, cause the processor to execute a plurality of functions and perform a particular control process, the particular control process comprising:
a standby screen displaying process comprising:
controlling the display to display a standby screen, the standby screen including a tab display area to display a plurality of tabs, and a tab screen display area to display a tab screen corresponding to a selected tab of the plurality of tabs, the plurality of tabs being associated with a plurality of tab screens, respectively, wherein each of the tab screens includes a plurality of icons associated with a corresponding tab, and at least one of the tab screens includes a particular specified function icon and at least one of a shortcut-registrable icon and a shortcut icon, the particular specified function icon being previously registered as an icon for causing the processor to execute a particular function of the plurality of functions, each function being registered with a corresponding one of specified function icons, the shortcut-registrable icon being an icon with which a shortcut function is registrable, the shortcut function enabling the processor to execute a specific function of the plurality of functions under a specific execution condition, the shortcut icon being generated to replace the shortcut-registrable icon therewith in response to the shortcut function being registered with the shortcut-registrable icon, the shortcut icon being configured to, when operated, cause the processor to execute the shortcut function;
a tab screen switching process comprising:
when the standby screen is displayed on the display, in response to detecting, via the touch panel, an indicating operation to indicate an unselected tab of the plurality of tabs displayed in the tab display area of the standby screen, bringing the indicated tab newly into a selected state instead of a currently-selected tab, and controlling the display to display a tab screen corresponding to the newly-selected tab in the tab screen display area; and
an icon operation responding process comprising:
when the particular specified function icon is displayed on the standby screen, in response to detecting, via the touch panel, an indicating operation to indicate the particular specified function icon, starting a process to execute the particular function registered with the specified function icon;
when the shortcut-registrable icon is displayed on the standby screen, in response to detecting, via the touch panel, an indicating operation to indicate the shortcut-registrable icon, beginning a process to register the shortcut function with the shortcut-registrable icon and generate the shortcut icon to replace the shortcut-registrable icon with the generated shortcut icon; and
when the shortcut icon is displayed on the standby screen, in response to detecting, via the touch panel, an indicating operation to indicate the shortcut icon, starting a process to execute the shortcut function registered with the shortcut icon.

15. The non-transitory computer-readable medium according to claim 14,
wherein the standby screen includes an administrator icon, and
wherein the particular control process further comprises:
an authentication process comprising:
when the standby screen is displayed on the display, in response to detecting, via the touch panel, an indicating operation to indicate the administrator icon, determining whether a particular authentication condition is satisfied;
a setting screen display process comprising:
in response to determining in the authentication process that the particular authentication condition is satisfied, controlling the display to display a standby screen setting screen, the standby screen setting screen including a tab display area to display the plurality of tabs, a tab screen display area to display a tab screen associated with a selected tab of the plurality of tabs, and an edit button display area to display a plurality of icon edit buttons; and
a display edit process comprising:
when the standby screen setting screen is displayed on the display, in response to an edit operation being performed on the standby screen setting screen, performing at least one kind of icon editing for a part or all of icons included in the plurality of tab screens respectively associated with the plurality of tabs, in accordance with the edit operation, the edit operation including at least an indicating operation to indicate a particular icon edit button of the plurality of icon edit buttons, each icon edit button being associated with a specific kind of icon editing.

16. The non-transitory computer-readable medium according to claim 15,
wherein the plurality of icon edit buttons displayed on the edit button display area include at least one of a position changing button and a deletion button, the position changing button being configured to, when operated, cause the processor to change positions of selected icons, the deletion button being configured to, when operated, cause the processor to delete, from the standby screen, at least one of the icons included in the plurality of tab screens respectively associated with the plurality of tabs.

17. The non-transitory computer-readable medium according to claim 16,
wherein the particular control process further comprises:
a pseudo standby screen display process comprising:
in response to a particular function of the plurality of functions being started, controlling the display to display a pseudo standby screen, the pseudo standby screen including at least one of the specified function icons; and
when a specified function icon is deleted from the standby screen in the display edit process, controlling the display not to display the deleted specified function icon on the pseudo standby screen; and a parallel execution process comprising:
in response to detecting, via the touch panel, an indicating operation to indicate a specified function icon on the pseudo standby screen, starting to execute a function associated with the indicated specified function icon, in parallel with the particular function currently in execution.

18. The non-transitory computer-readable medium according to claim 17,
wherein the plurality of functions include a facsimile function that enables the processor to transmit and receive facsimile data,
wherein the specified function icons include a facsimile icon configured to, when operated, cause the processor to execute the facsimile function,
wherein the facsimile function has a plurality of types of operational modes, any one of which is settable as a reception mode for receiving facsimile data, the plurality of types operational modes including a particular operational mode in which an indicating operation to indicate the facsimile icon needs to be detected via the touch panel to receive the facsimile data, and
wherein the pseudo standby screen display process further comprises:
even though the facsimile icon is deleted in the display edit process, when the particular operational mode is set as the reception mode, controlling the display to display the facsimile icon on the pseudo standby screen.

19. The non-transitory computer-readable medium according to claim 14,
wherein the shortcut function is registrable as one of:
a first shortcut function that is executed in response to at least one more indicating operation being detected via the touch panel after detection of an indicating operation to indicate a first shortcut icon corresponding to the first shortcut function; and
a second shortcut function that is executed without need for another indicating operation after detection of an indicating operation to indicate a second shortcut icon corresponding to the second shortcut function,
wherein the first shortcut icon corresponding to the first shortcut function includes a first image, the first image representing that the first shortcut icon is associated with the first shortcut function, and
wherein the second shortcut icon corresponding to the second shortcut function includes a second image different from the first image, the second image representing that the second shortcut icon is associated with the second shortcut function.

20. The non-transitory computer-readable medium according to claim 14,
wherein the plurality of functions include at least one of:
a scanning function to scan an image of a document sheet and generate image data of the scanned image;
a copy function to print, on a recording sheet, the image scanned by the scanning function; and
a facsimile function to transmit and receive facsimile data.

21. The non-transitory computer-readable medium according to claim 14, the particular control process further comprising:
controlling the display to concurrently display, on the at least one tab screen, the particular specified function icon and the at least one of the shortcut-registrable icon and the shortcut icon in such a manner that an intended icon is selected from among the particular specified function icon and the at least one of the shortcut-registrable icon and the shortcut icon, on the at least one tab screen with no need for switching a currently-selected tab to another tab.

22. The non-transitory computer-readable medium according to claim 14, the particular control process further comprising:
controlling the display to concurrently display, on the at least one tab screen, the particular specified function icon, the shortcut-registrable icon and the shortcut icon in such a manner that an intended icon is selected from among the particular specified function icon, the shortcut-registrable icon and the shortcut icon, on the at least one tab screen with no need for switching a currently-selected tab to another tab.

* * * * *